(12) United States Patent
Harviainen

(10) Patent No.: US 10,515,482 B2
(45) Date of Patent: Dec. 24, 2019

(54) SYSTEMS AND METHODS FOR ENHANCING AUGMENTED REALITY EXPERIENCE WITH DYNAMIC OUTPUT MAPPING

(71) Applicant: PCMS Holdings, Inc., Wilmington, DE (US)

(72) Inventor: Tatu V. J. Harviainen, Helsinki (FI)

(73) Assignee: PCMS Holdings, Inc., Wilmington, DE (US)

( * ) Notice: Subject to any disclaimer, the term of this patent is extended or adjusted under 35 U.S.C. 154(b) by 0 days.

(21) Appl. No.: 15/754,551

(22) PCT Filed: Aug. 17, 2016

(86) PCT No.: PCT/US2016/047370
§ 371 (c)(1),
(2) Date: Feb. 22, 2018

(87) PCT Pub. No.: WO2017/034886
PCT Pub. Date: Mar. 2, 2017

(65) Prior Publication Data
US 2018/0286129 A1 Oct. 4, 2018

Related U.S. Application Data

(60) Provisional application No. 62/209,193, filed on Aug. 24, 2015.

(51) Int. Cl.
*G06T 19/00* (2011.01)
*G06F 3/14* (2006.01)
(Continued)

(52) U.S. Cl.
CPC .......... *G06T 19/006* (2013.01); *G02B 27/017* (2013.01); *G06F 3/147* (2013.01);
(Continued)

(58) Field of Classification Search
CPC ..... G06T 19/006; H04L 67/38; G02B 27/017; G02B 2027/0138; G06F 3/147;
(Continued)

(56) References Cited

U.S. PATENT DOCUMENTS

| 4,638,428 A | 1/1987 | Gemma |
| 5,589,980 A | 12/1996 | Bass |

(Continued)

FOREIGN PATENT DOCUMENTS

| EP | 2713369 | 4/2014 |
| EP | 2869573 | 5/2015 |
| WO | 2011109903 | 9/2011 |

OTHER PUBLICATIONS

Flatley, J. "MIT's Junkyard Jumbotron Turns Your Motley Collection of Devices Into One Large Display (video)". Engadget web article, Mar. 14, 2011, 37 pages.

(Continued)

*Primary Examiner* — William A Beutel
(74) *Attorney, Agent, or Firm* — Invention Mine LLC

(57) ABSTRACT

Disclosed herein are systems and methods for configuring a multi-device digital experience. In an embodiment, the method includes presenting a first content portion of a digital experience via a wearable display device in an environment; presenting a second content portion of the digital experience via a first device in a set of one or more devices in the environment; capturing test-signal-output data presented by the first device, the test-signal-output data being captured by the wearable display device in the environment, the test-signal-output data being based on a test signal sent to the first device; estimating spatial-characteristic data of the first device based on the captured test-signal-output data; and modifying the presentation of the second content portion of (Continued)

the digital experience via the first device based on the estimated spatial-characteristic data of the first device.

20 Claims, 17 Drawing Sheets

(51) Int. Cl.
  *H04S 7/00*      (2006.01)
  *G06F 3/147*     (2006.01)
  *G02B 27/01*     (2006.01)
  *H04L 29/06*     (2006.01)

(52) U.S. Cl.
  CPC ............ *G06F 3/1423* (2013.01); *H04L 67/38* (2013.01); *H04S 7/303* (2013.01); *G02B 2027/0138* (2013.01); *G06F 3/1454* (2013.01); *H04S 7/301* (2013.01); *H04S 2400/11* (2013.01)

(58) Field of Classification Search
  CPC ...... G06F 3/1423; G06F 3/1454; H04S 7/303; H04S 2400/11; H04S 7/301
  See application file for complete search history.

(56) References Cited

U.S. PATENT DOCUMENTS

| | | | |
|---|---|---|---|
| 5,633,993 | A | 5/1997 | Redmann |
| 5,956,180 | A | 9/1999 | Bass |
| 6,906,762 | B1 | 6/2005 | Witehira |
| 7,133,083 | B2 | 11/2006 | Jaynes |
| 7,907,790 | B2 | 3/2011 | Inazumi |
| 7,953,462 | B2 | 5/2011 | Harry |
| 8,068,886 | B2 | 11/2011 | Vartanian |
| 8,427,396 | B1 | 4/2013 | Kim |
| 8,479,226 | B1 | 7/2013 | Cave |
| 8,576,276 | B2 | 11/2013 | Bar-Zeev |
| 8,711,091 | B2 | 4/2014 | Nomura |
| 8,730,354 | B2 | 5/2014 | Stafford |
| 8,988,343 | B2 | 3/2015 | Fei |
| 2001/0053996 | A1 | 12/2001 | Atkinson |
| 2003/0080923 | A1 | 5/2003 | Suyama |
| 2004/0125044 | A1 | 7/2004 | Suzuki |
| 2008/0291225 | A1 | 11/2008 | Arneson |
| 2008/0320126 | A1 | 12/2008 | Drucker |
| 2010/0007582 | A1 | 1/2010 | Zalewski |
| 2010/0053164 | A1 | 3/2010 | Imai |
| 2010/0321275 | A1 | 12/2010 | Hinckley |
| 2010/0328447 | A1 | 12/2010 | Watson |
| 2011/0221962 | A1 | 9/2011 | Khosravy |
| 2012/0127284 | A1* | 5/2012 | Bar-Zeev ............ G02B 27/017 348/53 |
| 2012/0146894 | A1 | 6/2012 | Yang |
| 2013/0155210 | A1 | 6/2013 | Ma |
| 2013/0300637 | A1 | 11/2013 | Smits |
| 2014/0160002 | A1* | 6/2014 | Dent ........................ G06F 3/038 345/156 |
| 2015/0104038 | A1 | 4/2015 | Kim |
| 2016/0212538 | A1 | 7/2016 | Fullam |

OTHER PUBLICATIONS

J. Schwarz, et. al. "Phone as a Pixel: Enabling Ad-Hoc, Large-Scale Displays Using Mobile Devices". Session: Phone Fun: Extending Mobile Interaction. CHI 2012, May 5-10, 2012, Austin, Texas, USA. pp. 2235-2238.
R. Azuma, et. al. "Recent Advances in Augmented Reality", Nov./Dec. 2001, IEEE Computer Graphics and Applications. pp. 34-47.
U. Yang, et. al. "Mixed Display Platform to Expand Comfortable Zone of Stereoscopic 3D Viewing". ETRI Journal, vol. 35, No. 2, Apr. 2013. pp. 352-355.
A. Härmä, et. al. "Augmented Reality Audio for Mobile and Wearable Appliances" Augmented Reality Audio for Appliances. Audio Eng. Soc., vol. 52, No. 6, Jun. 2004, pp. 618-639.
Techradar article on Qualcomm & Mini in car AR concept: www.techradar.com/news/wearables/mini-partnered-with-qualcomm-to-make-augmented-reality-glasses-1291801.
Notification of Transmittal of the International Search Report and the Written Opinion of the International Searching Authority, or the Declaration for PCT/US2016/047370, dated Nov. 9, 2016, 12 pages.
Written Opinion of the International Preliminary Examining Authority for PCT/2016/047370 dated Jul. 18, 2017, 9 pages.
Notification of Transmittal of the International Preliminary Report on Patentability for PCT/US2016/047370 dated Oct. 30, 2017.
"The Future of Display Technology from CES 2015" http://pureimage.ca/future-display-technology-ces-2015/.
"Report: Google X working on seamless, modular large-format displays" http://arstechnica.com/gadgets/2014/10/03/report-google-x-working-on-seamless-modular-large-format-displays/.
MIT Technology Review, Bendable Displays are Finally Headed to Market. Aug. 13, 2014, http://www.technologyreview.com/news/529991/bendable-displays-are-finally-headed-to-market/.
R. Raskar, et al, "The Office of the Future: A Unified Approach to Image-Based Modeling and Spatially Immersive Displays". SIGGRAPH 98, Orlando, Florida, Jul. 19-24, 1998; Computer Graphics Proceedings, Annual Conference Series, 1998. 10 pages.
L. Wolf, et. al. "Non-homogeneous Content-driven Video-retargeting". The School of Computer Science, Tel-Aviv University. 7 pages.
M. Nacenta, et. al. "E-conic: a Perspective-Aware Interface for Multi-Display Environments", pp. 279-288.
H. Park, et. al. "Undistorted Projection onto Dynamic Surface". Division of Electrical and Computer Engineering, Hanyang University, Seoul, Korea. 10 pages.
Notification of transmittal of the International Search Report and the Written Opinion of the International Searching Authority or the Declaration for PCT/US2016/054931 dated Dec. 19, 2016, 11 pages.
Notification of transmittal of the international preliminary report on patentability for PCT/US2016/054931 dated Sep. 15, 2017.
Jannick P. Rolland, Myron W. Krueger, and Alexei Goon, "Multifocal planes head-mounted displays". Jul. 2000 / vol. 39, No. 19 / Applied Optics, pp. 3209-3215.
"Multi-screen 3-D TV". Electronics Newsfront, edited by John Free. Popular Science, Dec. 1992, p. 25.
N. Lee, "castAR augmented reality glasses hit Kickstarter with a clip-on that transforms them into a VR headset" posted Oct. 14, 2013. Retrieved from; http://www.engadget.com/2013/10/14/castar-kickstarter-launch/.
Santiago Alfaro, "Surround Vision: A handheld screen for accessing peripheral content around the TV" http://web.media.mit.edu/~vmb/papers/alfaroms.pdf.
Brett R. Jones, et. al. "IllumiRoom: Peripheral Projected Illusions for Interactive Experiences". Session: Interacting around Devices; CHI 2013: Changing Perspectives, Paris, France, pp. 869-878. http://citeseerx.ist.psu.edu/viewdoc/download?doi=10.1.1.308.4384&rep=rep1&type=pdf.
NVidia 3D Vision. (n.d.). Retrieved Aug. 8, 2016, from https://www.nvidia.com/object/3d-vision-main.html.
NVidia 3DTV Play. (n.d.). Retrieved Jul. 6, 2016, from http://www.nvidia.com/object/3dtv-play-overview.html.
Nacenta, M., et. al., "E-conic: A Perspective-Aware Interface for Multi-Display Environments". YouTube link available at: https://www.youtube.com/watch?v=BX9Wc64F-Rs, Published on Dec. 17, 2008, 50 pages.
Hatmaker, T. "Amazon Fire Phone Dynamic Perspective 3D Demo". Web Link available at: https://vimeo.com/98661674, dated Jun. 19, 2014, 28 pages.
Benko, H., et. al., "Dyadic Projected Spatial Augmented Reality". UIST '14 Proceedings of the 27th annual ACM symposium on User interface software and technology, Oct. 2014, pp. 645-655.

(56) References Cited

OTHER PUBLICATIONS

Takashima, K., et. al., "A Shape-Shifting Wall Display that Supports Individual and Group Activities". Technical Report 2015-1072-05, Department of Computer Science, University of Calgary, (2015), 8 pages.
Alexander, J., et. al., "Tilt Displays: Designing Display Surfaces with Multi-Axis Tilting and Actuation". MobileHCI'12. ACM, Sep. 2012. p. 161-170.
Salzmann, M., et. al., "Convex Optimization for Deformable Surface 3-D Tracking". In: Computer Vision, 2007. ICCV 2007. IEEE 11th International Conference on. IEEE, (2007), pp. 1-8.
Heun, V., et. al., "Smarter Objects: Using AR technology to Program Physical Objects and their Interactions". CHI 2013, Extended Abstract, Apr. 27-May 2, 2013, 6 pages.
Sakurai, S., et. al., "A Middleware for Seamless Use of Multiple Displays". Springer-Verlag Berlin Heidelberg (2008), pp. 252-266.
Rädle, R., et. al., "HuddleLamp: Spatially-Aware Mobile Displays for Ad-hoc Around-the-Table Collaboration". ITS '14, Hardware, Sensing and Frameworks Nov. 2014, ACM 978-1-4503-2587-5, 10 pages.
Li, M., et. al., "Dynamic Tiling Display: Building an Interactive Display Surface Using Multiple Mobile Devices". Proceedings of the 11th International Conference on Mobile and Ubiquitous Multimedia (MUM 2012), Dec. 4-6, 2012, 4 pages.

\* cited by examiner

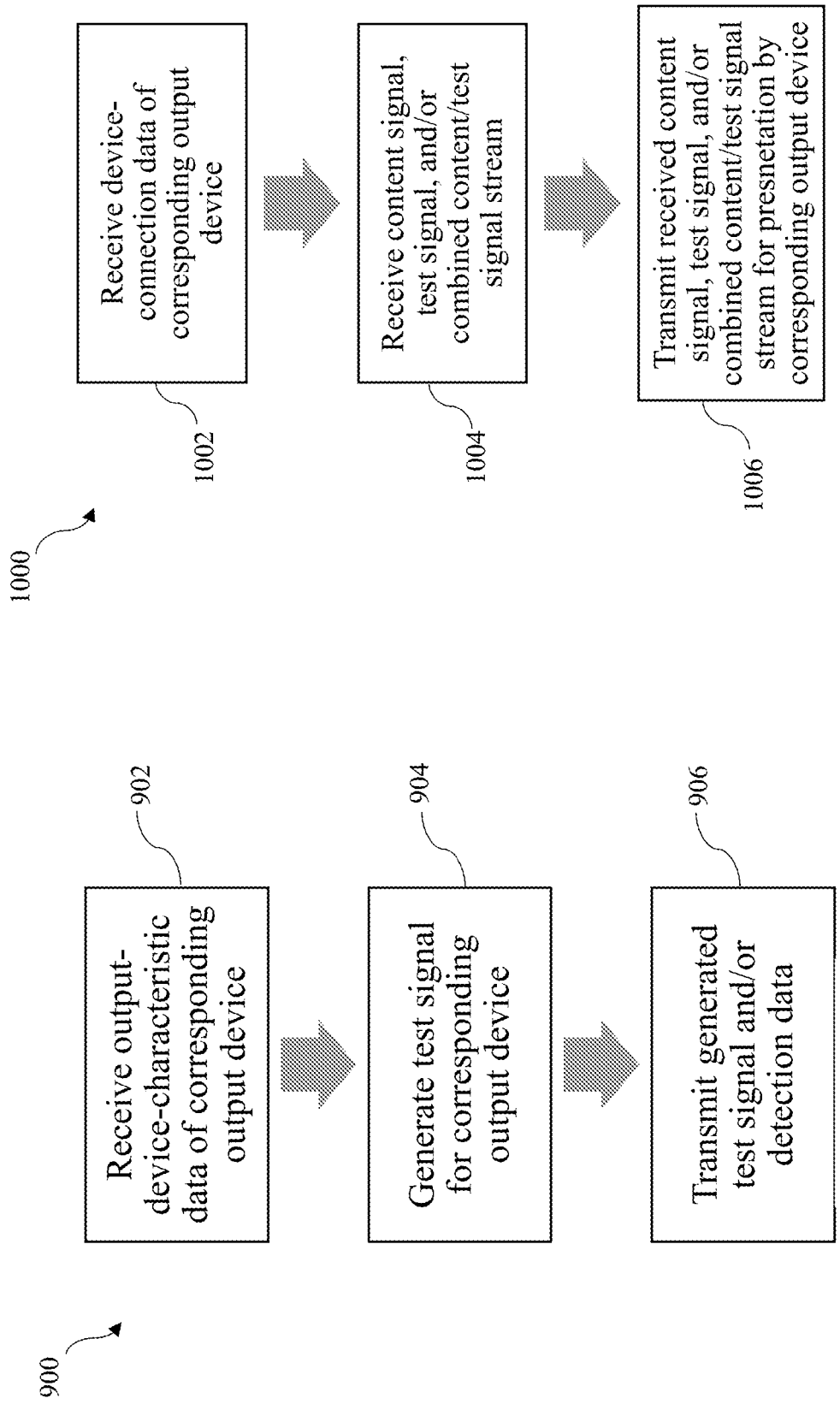

SYSTEMS AND METHODS FOR ENHANCING AUGMENTED REALITY EXPERIENCE WITH DYNAMIC OUTPUT MAPPING

CROSS-REFERENCE TO RELATED APPLICATION

This application is a national stage application under 35 U.S.C. 371 of International Application No. PCT/US2016/047370, entitled SYSTEMS AND METHODS FOR ENHANCING AUGMENTED REALITY EXPERIENCE WITH DYNAMIC OUTPUT MAPPING, filed on Aug. 17, 2016, which claims priority to U.S. Provisional Application No. 62/209,193, filed with the U.S. Patent and Trademark Office on Aug. 24, 2015 (2015 Aug. 24) and entitled "SYSTEM AND METHOD FOR ENHANCING AUGMENTED REALITY EXPERIENCE WITH DYNAMIC OUTPUT MAPPING."

BACKGROUND

Often, there are number of media devices present in an environment where users could be expected to engage in digital experiences. Increasingly, these media devices are capable of playing back media streamed to them from other devices. Current streaming solutions use one or more of a multitude of protocols, each available on different combinations of platforms and ecosystems. For example, streaming protocols may include Bluetooth, AptX, AirPlay, PlayFi, Miracast, WiDi, etc. Use cases for media streaming from a mobile device to other output devices are frequently limited to: 1) audio streaming to an audio device; 2) streaming of movies from a mobile device to a display screen; and 3) mirroring of a mobile device screen on a display screen.

Overview

Systems and methods are presented for enhancing a digital experience with dynamic output mapping. Exemplary systems and/or methods may extend presentation of a digital experience from a wearable display device to one or more output devices in an environment. Extending presentation of a digital experience from a wearable display device to one or more output devices in an environment may enable a more immersive digital experience as compared to presentation of the digital experience with only the wearable display device. Exemplary systems and/or methods may observe and/or capture test signal and/or content signal output from output devices to estimate output device location, orientation, and/or other spatial-characteristic data of corresponding output devices in an environment. In some embodiments, this data may be used to generate and/or adjust a virtual model of the environment and/or of the output devices within the environment. In some embodiments, based on the virtual model, content of the digital experience may be mapped to one or more particular output devices for presentation by the one or more particular output devices. Exemplary systems and/or methods may enable dynamic incorporation of one or more output devices into presentation of a digital experience.

In an exemplary embodiment, a method for configuring a multi-device digital experience is presented. One such method includes presenting a first content portion of a digital experience via a wearable display device in an environment; presenting a second content portion of the digital experience via a first device in a set of one or more devices in the environment; capturing test-signal-output data presented by the first device, the test-signal-output data being captured by the wearable display device in the environment, the test-signal-output data being based on a test signal sent to the first device; estimating spatial-characteristic data of the first device based on the captured test-signal-output data; and modifying the second content portion of the digital experience based on the estimated spatial-characteristic data of the first device.

In some embodiments, the presenting the second content portion of the digital experience via the first device comprises sending, to the first device, a second-content-portion stream that comprises the second content portion of the digital experience.

In some embodiments, the second-content-portion stream includes the test signal.

In some embodiments, the test-signal-output data presented by the first device is a subset of the presented second content portion of the digital experience.

In some embodiments, the test signal is distinct from the second-content-portion stream.

In some embodiments, the method further includes analyzing second-content-portion data presented by the first device, wherein the second-content-portion data is distinct from the test-signal-output data, wherein the modifying of the second content portion of the digital experience is further based on the analyzed second-content-portion data.

In some embodiments, the method further includes presenting, via a second device in the set of one or more devices in the environment, a third content portion of the digital experience concurrently with the presenting of the second content portion of the digital experience via the first device.

In some embodiments, the wearable display device captures the test-signal-output data using one or both of an RGB-D sensor and a microphone array.

In some embodiments, the method further includes selecting the test signal based on one or more playback capabilities of the first device; and sending the test signal to the first device.

In some embodiments, the method further includes identifying the first device using one or more communication protocols.

In some embodiments, the method further includes adjusting the estimated spatial-characteristic data of the first device based on a comparison of the presented second portion of the digital experience to an expected presentation of the second portion of the digital experience.

In some embodiments, the method further includes evaluating the presented second portion of the digital experience based on an expected presentation of the second portion of the digital experience; and determining, based on the evaluating, whether the output device is underperforming in presenting the second portion of the digital experience.

In some embodiments, the method further includes ceasing presentation of the second portion of the digital experience responsive to determining that the first device is underperforming in presenting the second portion of the digital experience.

In some embodiments, the estimated spatial-characteristic data of the first device comprises at least one of location data of the first device and orientation data of the first device.

In an exemplary embodiment, a system for configuring a multi-device digital experience is presented. One such system includes a wearable display device configured to present a first content portion of a digital experience in an environment, wherein a first device is configured to present a second content portion of the digital experience in the environment;

wherein the wearable display device is further configured to: capture test-signal-output data presented by the first device, the test-signal-output data being based on a test signal sent to the device; estimate spatial-characteristic data of the first device based on the captured test-signal-output data; and modify the presentation of the second content portion of the digital experience based on the estimated spatial-characteristic data of the first device.

In an exemplary embodiment, a system is disclosed that includes: a polling module configured to detect multiple sensory output devices capable of electronic communication control within an environment; a test signal generation module configured to generate test signals for the detected sensory output devices; and a content output module. The content output module may be configured to: split content to be output by the detected sensory output devices into respective content streams, combine the test signals and respective content streams to generate a plurality of transmission streams, and stream the transmission streams to the detected sensory output devices.

The disclosed system may also include: an output detection module configured to capture sensory data output by the detected sensory output devices, wherein the captured sensory data includes data corresponding to the test signals streamed to the detected sensory output devices; and an environment modeling module configured to receive the captured sensory data from the output detection module, wherein the environment modeling module is further configured to use the captured sensory data to generate a model of the detected sensory output devices within the environment.

In various examples, the output detection module may include an RGB-D camera, a microphone array, and/or be in the form of an augmented reality headset device. The polling module may be configured to detect the multiple sensory output devices using multiple communication protocols. The multiple communication protocols may include a wireless communication protocol. The wireless communication protocol may include at least one wireless communication protocol selected from a group of wireless communication protocols including AirPlay, Miracast, WiDi, Chromecast, and/or DLNA. Further, at least one of the multiple communication protocols may include a Bluetooth protocol.

The multiple sensory output devices may include one or more of: 1) a display device; 2) an audio device; and/or 3) a smart lighting device.

The test signal generation module may be configured to generate one or more fiducial markers to one or more display devices within the environment. Additionally, or in the alternative, the test signal generation module may be configured to generate one or more distinctive audio signals to one or more audio devices within the environment.

The content output module may be further configured to split content to be output by the detected sensory output devices based, at least in part, on the model of the detected sensory output devices generated by the environment modeling module.

In an exemplary embodiment, a method for configuring an augmented reality system is also disclosed. One such method includes: receiving information relating to a plurality of devices in an environment; sending, to each device of the plurality of devices, a test signal for the device; capturing information corresponding to presentation of each test signal by each device of the plurality of devices; determining, based at least in part on the information corresponding to the presentation of each test signal by each device of the plurality of devices, position and orientation information for the device; responsive to a determination that a subset of the plurality of devices appropriately reproduced their test signals, sending to each device of the subset of the plurality of devices, information causing presentation of a portion of content for generating a augmented reality experience; wherein the information causing presentation of a portion of content for generating the augmented reality experience is generated based, at least in part, on position and orientation information for each device of the plurality of devices.

In accordance with one example, each test signal may be selected based on the capabilities of the device as conveyed by the received information relating to each device of the plurality of devices in the environment. Information regarding the presentation of each test signal may include information regarding an orientation of a display screen associated with the device. The test signal may be the actual content provided to the device as opposed to a test signal distinct from the actual content provided to the device.

Further, information corresponding to the presentation of each test signal by each device may be captured using an RGB-D camera and/or at least one microphone associated with an augmented reality headset worn by a user. Capturing information corresponding to the presentation of each test signal by each device may include capturing information from an RGB-D camera and/or at least one microphone associated with an augmented reality headset worn by the user.

In an exemplary embodiment, a method of dynamic configuration of distributed multi-device augmented reality experiences is also disclosed. The method includes: constructing a virtual model of an environment and output devices in the environment; polling for new output devices in the environment using multiple protocols used to communicate with media streaming and/or device control streaming; connecting the new output devices found from the environment; generating test signals for the new output devices, wherein the test signal is generated for use in detecting device location, characteristics, and/or channel mappings for the new output devices; constructing content elements to be sent to the new output devices; deriving test patterns combining content signals and the test signals; transmitting derived test patterns embedded in content signals for the new output devices; observing output from the new output devices from a user's perspective; analyzing observed test signals to estimate locations and characteristics of the new output devices; analyzing observed content output to detect deviations from desired output; and dynamically adjusting, in an iterative manner, the virtual model of the environment to minimize deviations between desired output and observed output of the output devices.

The method may also include dropping output devices that are not needed and/or that do not perform acceptably within predetermined parameters.

In an exemplary embodiment, a method of providing an augmented reality presentation is disclosed. One such method includes identifying at least one local media output device; and providing at least a first portion of the augmented reality presentation on the local media output device and a second portion of the augmented reality presentation on an augmented reality headset.

In some embodiments, the local media output device is at least one speaker.

In some embodiments, the local media output device is at least one monitor.

In some embodiments, the example method includes portioning the augmented reality presentation into the first portion and the second portion, wherein the partitioning is based at least in part on the type and location of the local media output device.

In some embodiments, the example method includes the identifying of the at least one local media devices include polling for local media devices.

In some embodiments, the example method includes sending a test signal to the local media device; receiving the local media device's playback of the test signal; and determining a characteristic of the local media device based on the local media device's playback. In some embodiments, the example method includes portioning the augmented reality presentation into the first portion and the second portion, wherein the partitioning is based at least in part on the characteristic of the local media output device.

BRIEF DESCRIPTION OF THE DRAWINGS

FIG. 9 is a flow chart of an exemplary method for test-signal generation/transmission for one or more output devices employed in a multi-device digital experience configuration.

FIG. 10 is a flow chart of an exemplary method for streaming a content signal, a test signal, and/or a combined content/test-signal stream for presentation by an output device employed in a multi-device digital experience configuration.

DETAILED DESCRIPTION

The disclosed systems and methods enable expansion of digital experiences (e.g., augmented reality experiences) to one or more devices (e.g., available wireless streaming/control enabled output devices) in an environment. Output devices may be connected and used dynamically, so that the digital experience adjusts to the environment and/or dynamic events in the environment. Dynamic output mapping may be used for identifying and/or connecting media devices capable of outputting streamed content. Streamed content may include audio and/or visual information. Streamed content may also include control streams to devices that may not be traditionally considered as media devices, such as smart lighting devices. The disclosed systems and methods may be used to provide a more immersive and/or enhanced digital experience in various environments, for example, as compared to a digital experience presented only on a single display device.

The management of the output device calibration and/or configuration may be handled automatically. For example, the management of output device calibration and/or configuration may be handled without corresponding input from a user. Such automatic calibration and configuration may be used to generate a rich experience in a wide array of environments and use scenarios. Use environments can include: 1) a future smart city environment with large numbers of embedded output devices available to public; 2) a modest living room with few streaming devices; and/or 3) environments designed to support virtual reality using large display surfaces surrounding the user. Use scenarios may include scenarios extending from simple entertainment to support in office work to telepresence.

Figure 1:
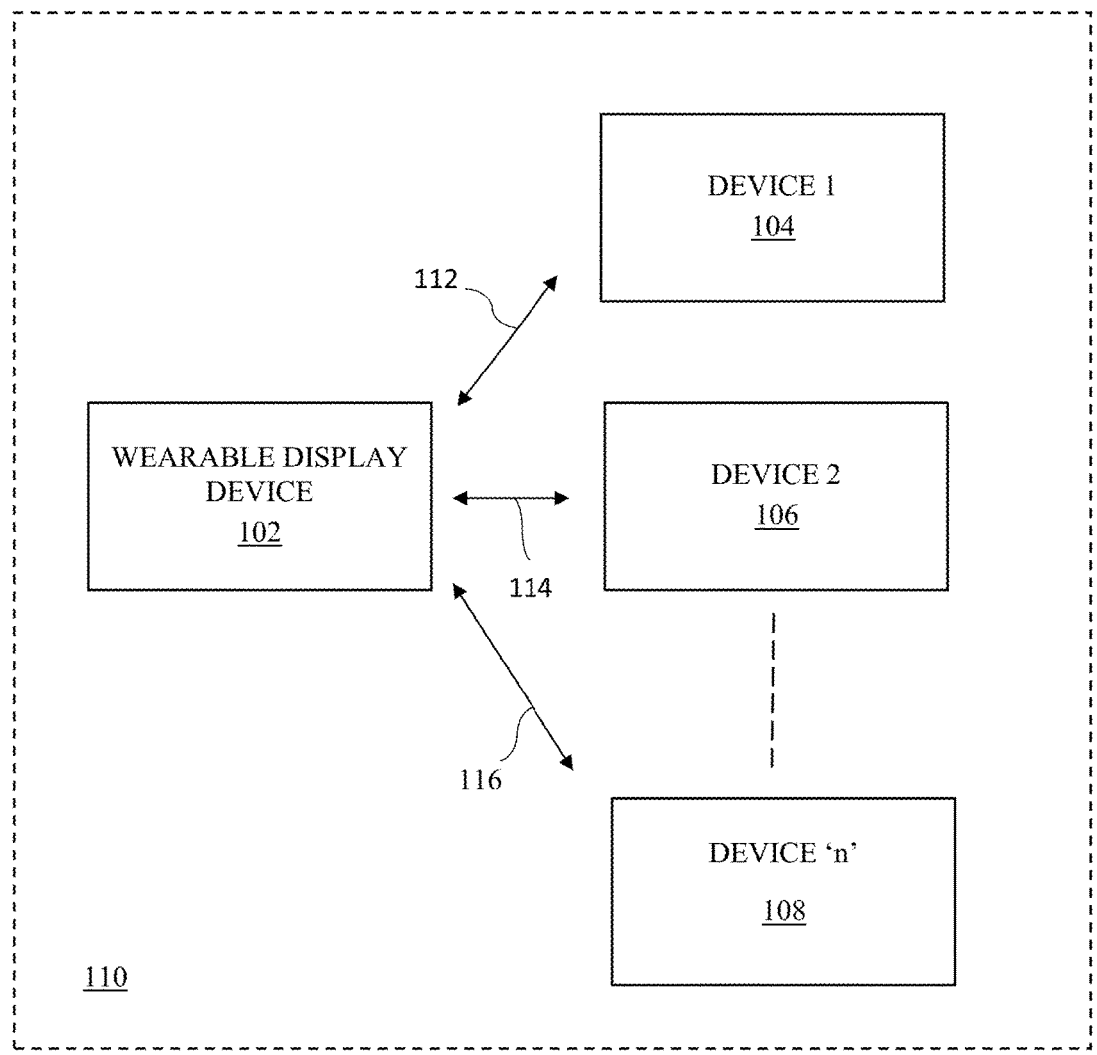
FIG. 1 is a block diagram of an exemplary scenario for implementing a multi-device digital experience in an environment.

FIG. 1 is a block diagram of an exemplary scenario 100 for implementing a multi-device digital experience in accordance with some embodiments. The exemplary scenario 100 of FIG. 1 includes a wearable display device 102 and a set of one or more devices including at least one of a device 1 104, a device 2 106, and a device 'n' 108. As illustrated in FIG. 1, in the exemplary scenario 100, the wearable display device 102, the device 1 104, the device 2 106, and the device 'n' 108 are located in an environment 110. The example scenario 100 enables extension of a digital experience (e.g., an augmented reality experience, a virtual reality experience, and/or a mixed reality experience) from the wearable display device 102 to at least one of the device 1 104, the device 2 106, and the device 'n' 108. In some embodiments, the wearable display device 102 presents a first content portion of the digital experience and at least one of the device 1 104, the device 2 106, and/or the device 'n' 108 present another content portion of the digital experience. Presentation of content portions of the digital experience via the wearable display device 102 and at least one of the device 1 104, the device 2 106, and/or the device 'n' 108, may provide a multi-device digital experience, for example, for a user wearing the wearable display device 102.

The wearable display device 102 may be configured for communication with the device 1 104, the device 2 106, and/or the device 'n' 108. An exemplary architecture of the wearable display device 102 is described below in connection with FIG. 16. As illustrated in FIG. 1, the wearable display device 102 may communicate with device 1 104 via communication link 112, may communicate with the device 2 106 via communication link 114, and/or may communicate with device 'n' 108 via communication link 116. Each of the communication links 112, 114, and 116 may be provided over any suitable communication network or protocol, including for example wired and wireless networks and protocols. For example, the wearable display device 102 and the device 1 104 may be configured to wirelessly communicate with each other via Bluetooth® via the communication link 112. In another example, the wearable display device 102 and the device 1 104 may additionally or alternatively be configured to communicate with each other via the communication link 112 which includes one or more servers (e.g., one or more remote servers) connected to one or more networks. An exemplary architecture of a networked server that may communicate with the wearable display device 102 and/or the device 1 104 is described below in connection with FIG. 17.

In some embodiments, the wearable display device 102 is configured to present a digital experience to a user wearing the wearable display device 102. The user wearing the wearable display device 102 may move within the environment, which may affect presentation of the digital experience. For example, as the user moves in the environment 110, the wearable display device 102 may observe (e.g., capture via a sensor) and/or receive (e.g., be transmitted and/or access in storage) data corresponding to the environment 110 and/or corresponding to the one or more devices within the environment 110 (e.g., data corresponding to newly discovered devices, data corresponding to updated/current position information of the one or more of the devices, etc.). As a result of observing and/or receiving the data, the wearable display device may implement one or more adjustments/modifications, for example, corresponding to inclusion of the one or more devices in the presentation of the digital experience and/or corresponding to mapping and/or distribution of the portions of the content of the digital experience to the one or more devices in the environment 110.

It should be understood that the locations in the environment 110 of the wearable display device 102, the device 1 104, the device 2 106, and the device 'n' 108 illustrated in FIG. 1 are for exemplary purposes only and are not intended to be limiting in any way. Further, although FIG. 1 illustrates the exemplary scenario 100 including at least the wearable display device, the device 1 104, the device 2 106, and the device 'n' 108 in the environment 110, any number of suitable devices may be employed for implementing a multi-device digital experience. For example, in some embodiments, the scenario 100 includes the wearable display device 102 and only one of the device 1 104, the device 2 106, and the device 'n' 108.

Figure 2B:
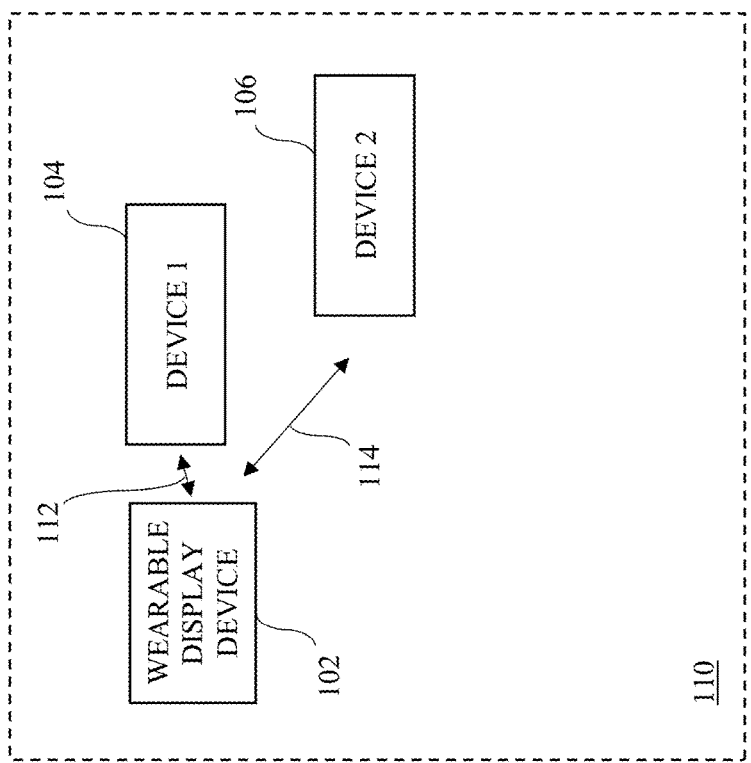
FIG. 2B is block diagram of a simplified view of the exemplary scenario for implementing the multi-device digital experience of FIG. 1.
Figure 2A:
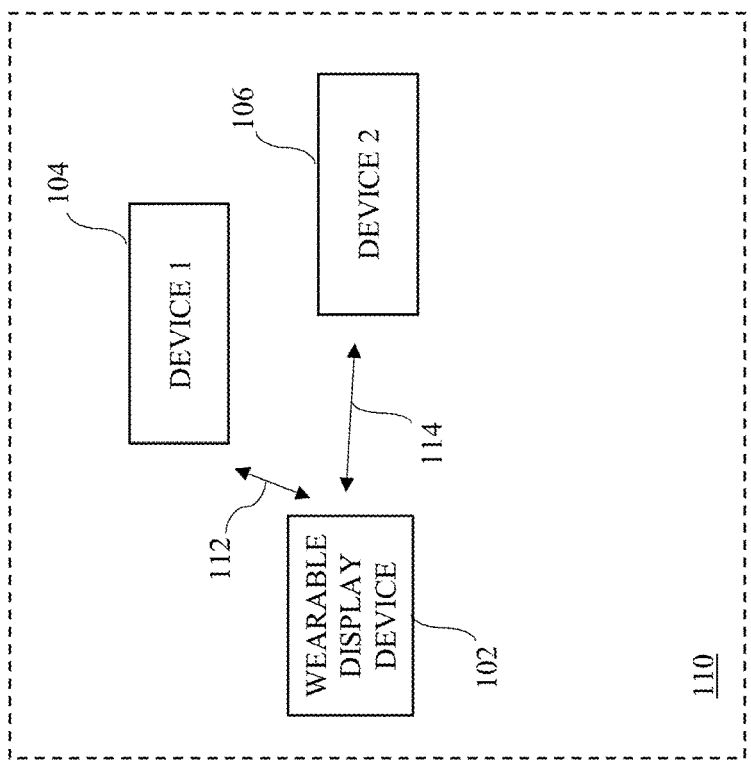
FIG. 2A is a block diagram of a simplified view of the exemplary scenario for implementing the multi-device digital experience of FIG. 1.

FIG. 2A and FIG. 2B are each a block diagram of a simplified view of the exemplary scenario 100 of FIG. 1 for implementing a multi-device digital experience in accordance with some embodiments. The simplified views of the exemplary scenario 100 illustrated in FIGS. 2A and 2B each include the wearable display device 102, the device 1 106, and the device 2 106 in the environment 110.

As illustrated in FIG. 2A, the wearable display device 102 is in a first location relative to the device 1 104 and to the device 2 106. As illustrated in FIG. 2B, the wearable display device 102 is in a second location with respect to the device 1 104 and the device 2 106. In some embodiments, the user wearing the wearable display device 102 moves in the environment 110, and as a result, the wearable display device 102 may be moved accordingly with the user. As the user moves with the wearable display device 102, the location of the wearable display device 102 relative to the device 1 104 and/or to the device 2 106 may change. This change in relative location between the wearable display device and the device 1 104 and/or the device 2 106 may result in a modification of the respective content portions of the digital experience (e.g., by the wearable display device 102) that are sent to and/or presented by the device 1 104 and/or the device 2 106.

For example, the wearable display device 102 may be moved in the environment 110 from the first location shown in FIG. 2A to the second location shown in FIG. 2B. In this example, the device 1 104 is configured to playback audio (e.g., a content portion of the digital experience including audio) streamed to the device 1 104 (e.g., an audio signal of heavy rainfall and/or an audio signal of screeching tires and honking of a horn of a car) and the device 2 106 is configured to playback video (e.g., a portion of the digital experience including video) streamed to the device 2 106 (e.g., a video of a police car with emergency lights of the police car flashing). Further, in this example, the digital experience presented to the user via the wearable display device 102 is an image from the user's viewpoint of the user in the driver's seat of a car driving on a road during a rainstorm. Based, in part, on the relative location of the wearable display device 102 with respect to the device 1 104 illustrated in FIG. 2A, the wearable display device 102 streams an audio signal of audio of heavy rainfall to the device 1 104. Based, in part, on the relative location of the wearable display device 102 with respect to the device 2 106 illustrated in FIG. 2A, the wearable display device 102 streams a video signal of a police car with emergency lights flashing and parked on the side of a road. As a result of the movement of the wearable display device from the first location to the second location, the respective content portions streamed to the device 1 104 and the device 2 106 may be modified (e.g., by the wearable display device 102). For example, as the wearable display device 102 moves from the first location to the second location (e.g., to within a threshold distance from the device 1 104), the wearable display device 102 may stream a content portion of the digital experience including an audio signal of screeching tires and honking of a horn of a car which may be presented by the device 1 104 (e.g., to suggest to the user that the user moved his car to a location too close to another car on the road). Further, for example, as the wearable display device 102 moves from the first location to the second location, the wearable display device 102 may stream a content portion of the digital experience including a video signal of the police car that is scaled (e.g., zoomed-out) and/or shifted as compared to the video of the police car streamed to the device 2 106 at the first location (e.g., to give an effect that user's car is further away from the police car at the first location of the wearable display device 102).

Figure 3A:
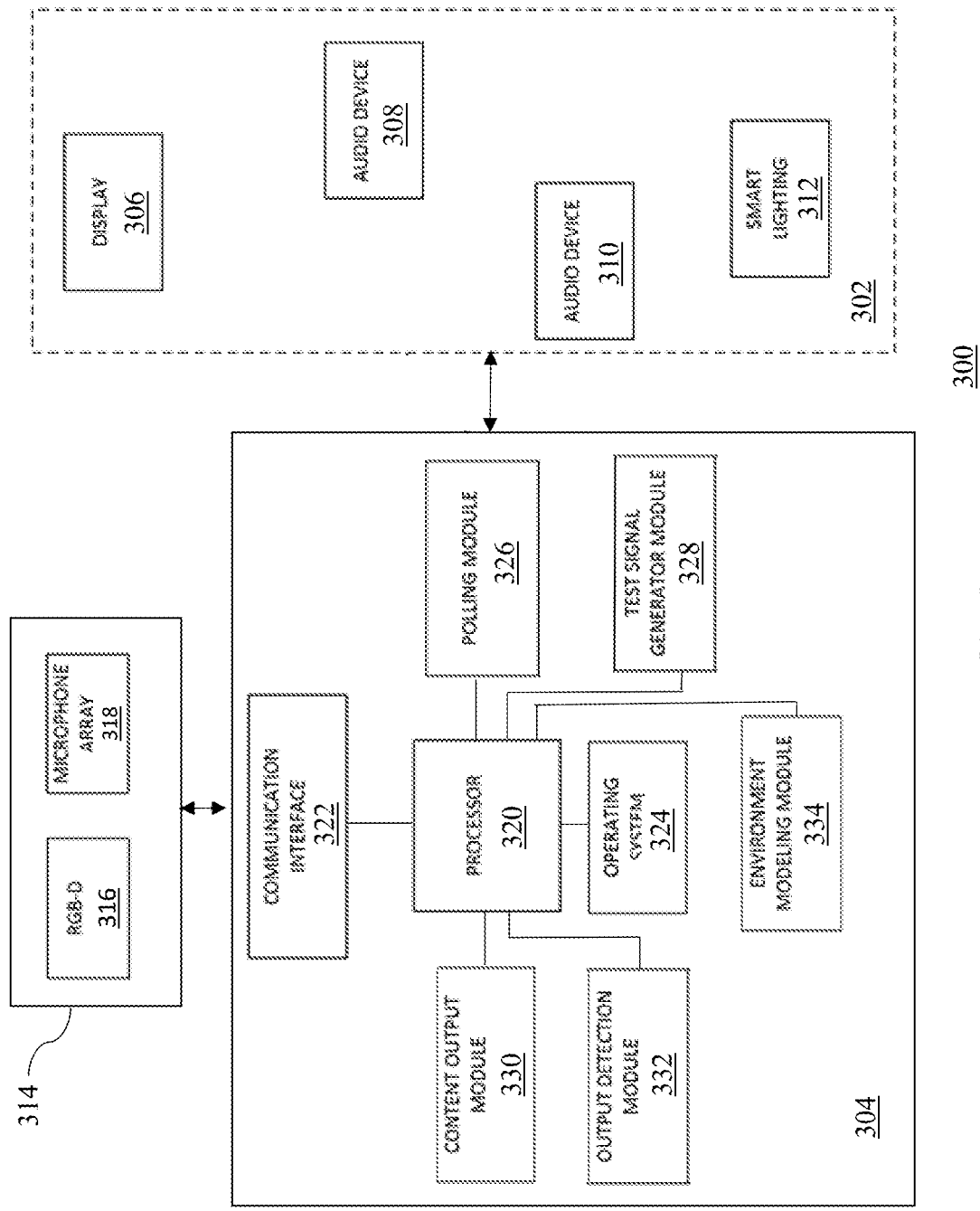
FIG. 3A is a block diagram of an exemplary architecture that may be used for implementing a multi-device digital experience in an environment.

FIG. 3A is a block diagram of an exemplary scenario 300 for implementing a multi-device digital experience. In some embodiments, the exemplary scenario 300 of FIG. 3A implements dynamic output mapping of devices within an environment 302. The exemplary scenario 300 of FIG. 3A includes a master device 304 that is configured for wireless communication with one or more sensory output devices located in the environment 302. In some embodiments, the one or more sensory output devices are capable of electronic communication control by the master device 304. In the example illustrated in FIG. 3A, the one or more sensory output devices include a display 306, a first audio device 308, a second audio device 310, and a smart lighting device 312. The one or more sensory output devices may additionally or alternatively include other devices that are capable of providing an output that may be sensed by a user. The one or more sensory output devices may be physically located at different places throughout the environment 302. Further, the one or more sensory output devices may have different device characteristics (e.g., audio device 308 may be a different type of audio device than audio device 310). Still further, the one or more sensory output devices may employ different communication protocols.

As illustrated in FIG. 3A, the example scenario 300 also includes a plurality of sensors 314 to monitor sensory outputs of the sensory output devices. The plurality of sensors 314 may be physically integrated with the master device 304 and/or disposed at a separate location within the environment 302. Still further, multiple sensor banks may be disposed at multiple locations within the environment 302. In the example scenario 300 of FIG. 3A, the plurality of sensors 314 include an RGB-D camera 316 and a microphone array 318. In some embodiments, the sensors 314 may include multiple RGB-D cameras and/or multiple microphone arrays disposed at the master device 304 and/or throughout the environment 302.

In some embodiments, the exemplary scenario 300 is the same as the exemplary scenario 100 described in connection with FIG. 1. In these such embodiments, the wearable display device 102 corresponds to the combination of master device 304 and the sensors 314.

In some embodiments, the master device 304 has an architecture as shown in FIG. 3A. The example architecture of the master device 304 of FIG. 3A includes a processor 320 configured to: 1) communicate with the one or more sensory output devices using communication interface 322; 2) receive information from the sensors 314 through, for example, communication interface 322; 3) control hardware operations associated with one or more hardware modules; and/or 4) execute application code associated with one or more modules in conjunction with, for example, an operating system 324.

In this example architecture of the master device 304, various hardware and software elements are referred to as "modules" that carry out (e.g., perform, execute, and the like) various functions that are described in connection with the respective modules. A module may include hardware (e.g., one or more processors, one or more microprocessors, one or more microcontrollers, one or more microchips, one or more application-specific integrated circuits (ASICs), one or more field programmable gate arrays (FPGAs), one or more memory devices). Each described module may also include instructions executable for carrying out the one or more functions carried out by the respective module. Such instructions may take the form of or include hardware (i.e., hardwired) instructions, firmware instructions, software instructions, and/or the like, and may be stored in any suitable non-transitory computer-readable medium or media. This media may include RAM, ROM, EPROM, $E^2$PROM, etc. In one example, the example scenario 300 may include Smart Glasses, such as "Google Glass®" or another type of augmented reality headset.

The master device 304 of the example scenario 300 shown in FIG. 3A includes a polling module 326 configured to detect the one or more sensory output devices (e.g., one or more active sensory output devices) located within the environment 302. For example, the polling module 326 may transmit connection request signals using one or more communication protocols to detect an original configuration of the environment 302 (e.g., a configuration of the one or more sensory output devices in the environment 302 relative to the master device 304 when the one or more sensory output devices are first detected by the polling module 326) and/or may detect changes to the one or more sensory output devices within the environment 302.

In some embodiments, the master device 304 also includes a test-signal generation module 328 that is configured to generate test signals for the detected sensory output devices (e.g., the one or more sensory output devices detected by the polling module 326). The test-signal generation module 328 may generate a test signal respectively associated with each of the sensory output devices detected in the environment 302. The type of test signal used (e.g., generated by the test-signal generation module 328) for one of the one or more sensory output devices may differ from the type of test signal used for another one of the one or more sensory output devices.

In some embodiments, the master device 304 includes a content output module 330, as shown in the example architecture of the master device 304 of FIG. 3A. The content output module 330 may be configured to execute a number of different functions. For example, the content output module 330 may split content to be output by the detected sensory output devices into respective content streams. Further, the content output module 330 may combine the test signals and the respective content streams to generate a plurality of transmission streams. In some embodiments, these transmission streams, including the test signals, are then transmitted to the detected sensory output devices.

The master device 304 may also include an output detection module 332. The output detection module 332 may be configured to capture sensory data output by one or more of the detected sensory output devices. In some embodiments, the captured data includes data corresponding to the test signals streamed to the detected sensory output devices and/or presented via the respective one or more detected sensory output devices.

In some embodiments, an environment modeling module 334 is also included. The environment modeling module 334, for example, is configured to receive the captured data output provided by the output detection module 332. Further, the environment modeling module 334, for example, is configured to generate a model of the detected sensory output devices within the environment 302. In some embodiments, the resulting model is used to control the streaming of content to media devices and/or lighting controls in the environment 302 (e.g., respective content portions of the digital experience streamed to the one or more detected sensory output devices is based on the model generated and/or updated by the environment modeling module 334).

Although each of the processor 320, the communication interface 322 and the operating system 324 is depicted as a separate component in FIG. 3A from each other and from the polling module 326, the test-signal generation module 328, the content output module 330, the output detection module 332, and the environment modeling module 334, it will be appreciated that one or more of the processor 320, the communication interface 322, and/or the operating system 324 may be totally or partially embedded and/or coupled to the polling module 326, the test-signal generation module 328, the content output module 330, the output detection module 332, and/or the environment modeling module 334 in any suitable combination or sub-combination.

Figure 3B:
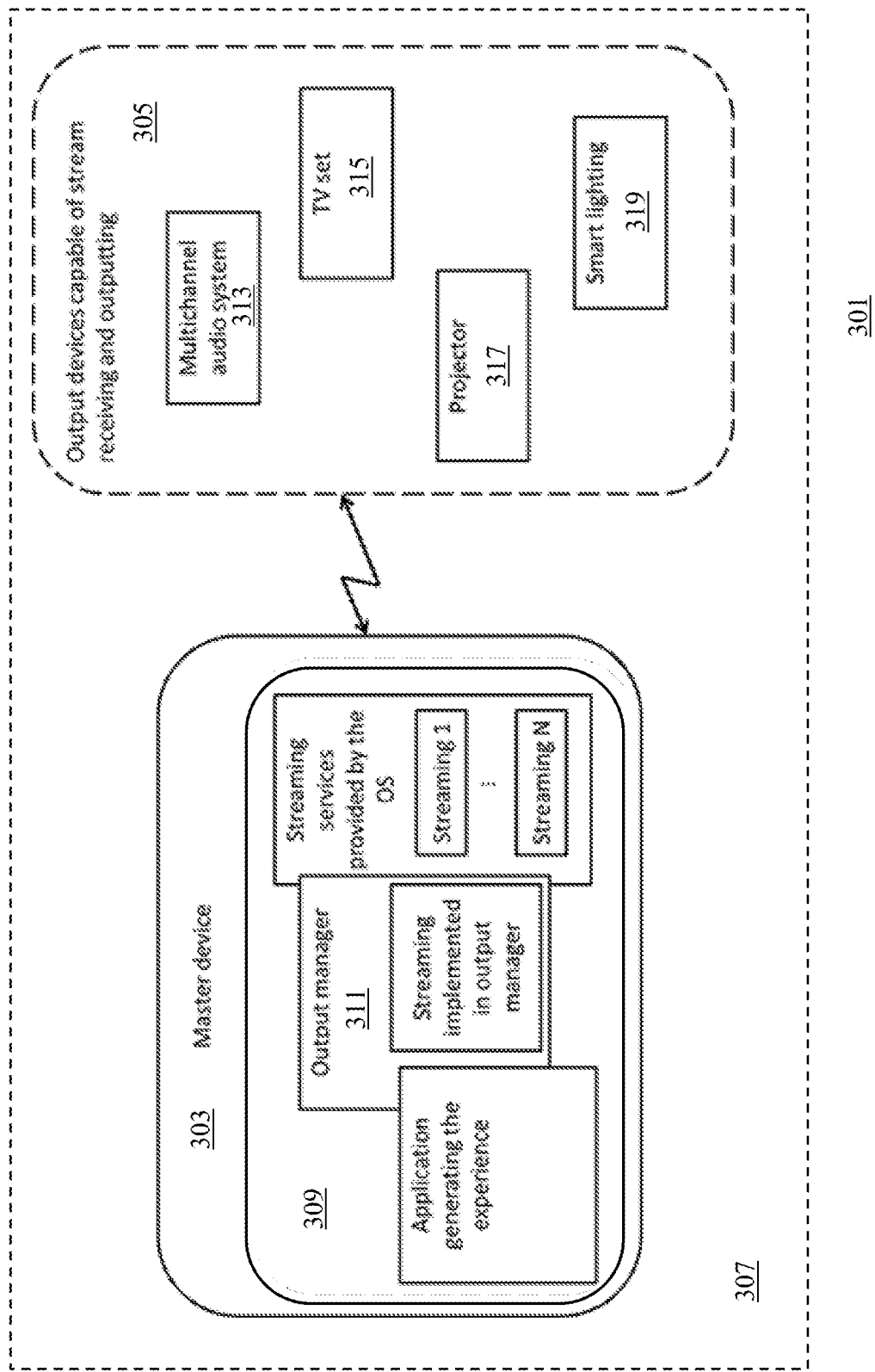
FIG. 3B is a block diagram of another exemplary architecture that may be used for implementing a multi-device digital experience system in an environment.

FIG. 3B is a block diagram of an exemplary scenario 301 for implementing a multi-device digital experience. In some embodiments, the exemplary scenario 301 is the same as the exemplary scenario 100 described in connection with FIG. 1 and/or the same as exemplary scenario 300 described in connection with FIG. 3A. The exemplary scenario 301 of FIG. 3B includes a master device 303 and a cluster of devices 305. In the exemplary scenario 301 of FIG. 3B, the master device 303 and the cluster of devices 305 are located in an environment 307. In this example, the master device 303 is configured to execute playback of a content portion of the digital experience. In some embodiments, the master device 303 presents a content portion of the digital experience and/or streams content portions to one or more devices in the cluster of devices 305. In some embodiments, the master device 303 includes a software component 309. The software component 309 may be embedded with an application performing the content playback. Additionally, or in the alternative, the software component 309 may be implemented as an independent software component or as part of an operating system (e.g., the operating system 324 of FIG. 3B). The software component 309 may include an output manager 311 that uses, for example, streaming solutions that the output manager 311 implements itself and/or that are provided by the operating system to connect wirelessly to the one or more devices in the cluster of devices 305 in the environment 307. The cluster of devices 305 of FIG. 3B includes multichannel audio system 313, TV set 315, projector 317, and smart lighting 319. The devices illustrated in the cluster of devices 305 are for exemplary purposes only and are not intended to be limiting in any way. In some embodiments of the scenario 301, one or more devices other than those illustrated in the cluster of devices 305 in FIG. 3B that are capable of contributing to the digital experience by receiving and/or presenting streamed-multimedia content and/or steamed-multimedia content elements may be employed.

Figure 4:
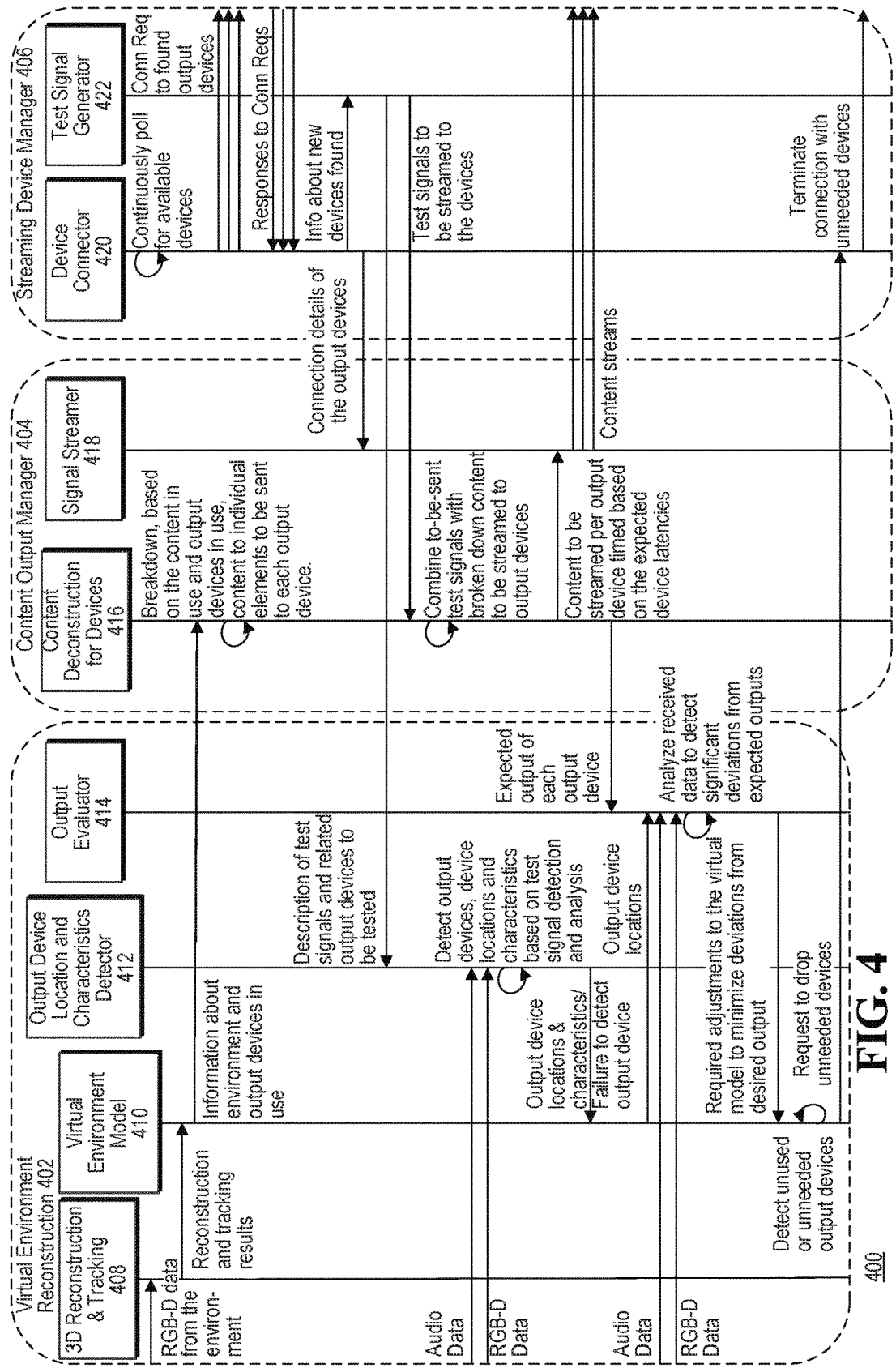
FIG. 4 is a block diagram of an exemplary architecture of a wearable display device and an exemplary data flow and/or data processing that may be employed for implementing a multi-device digital experience.
Figure 14:
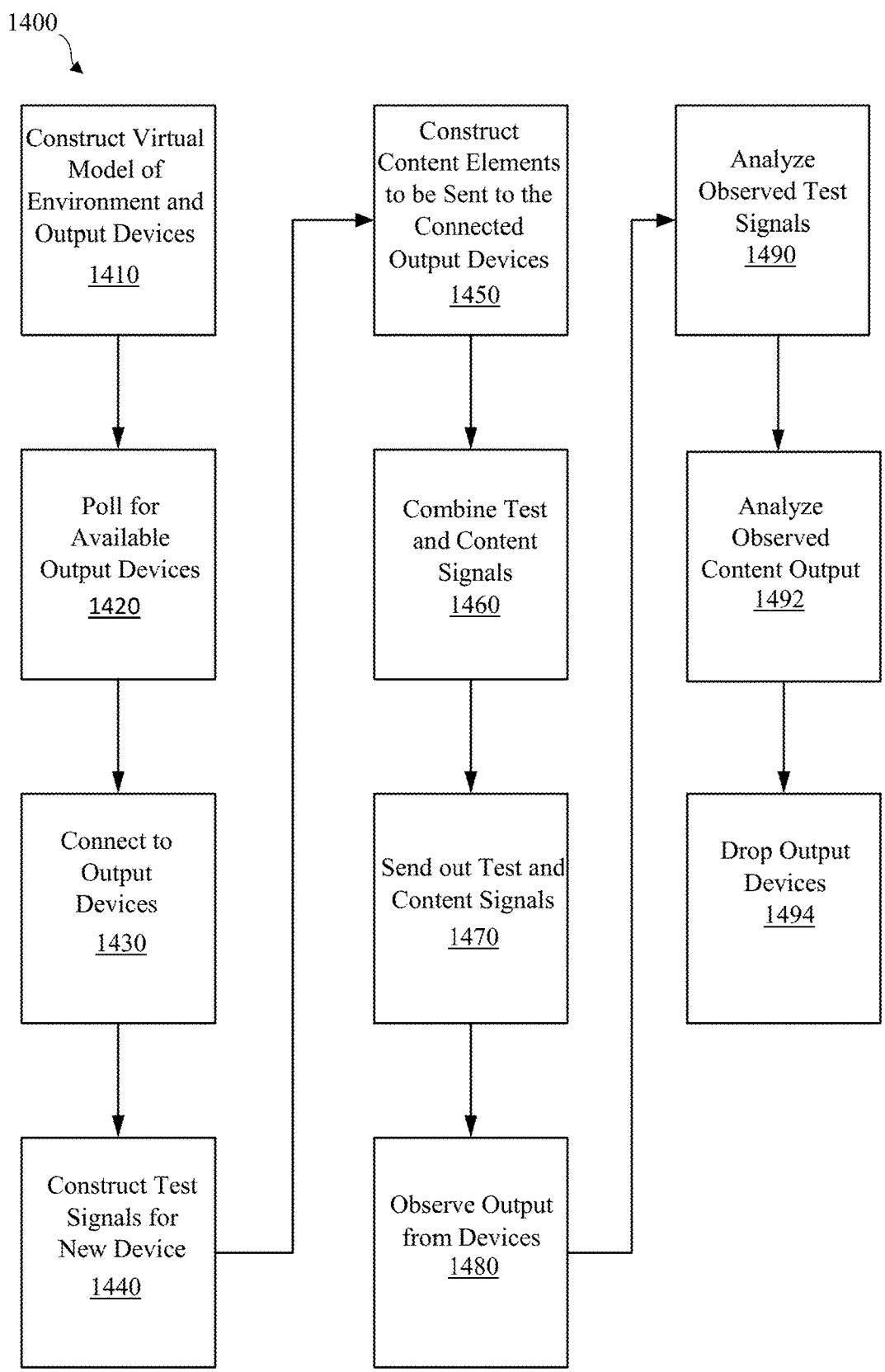
FIG. 14 is a flow chart of exemplary operations that may be executed to implement a multi-device digital experience configuration.

FIG. 4 is a block diagram of an exemplary architecture 400 of a wearable display device and an exemplary data flow and/or data processing that may be employed for implementing a multi-device digital experience. The exemplary architecture 400 may enable enhancement of the digital experience with one or more devices (e.g., one or more media-playback-capable devices) by managing the streaming of content portions of the digital experience to the one or more devices. In some embodiments, the wearable display device, in the role of a content playback device, manages the digital experience using an architecture such as the architecture 400 shown in the example illustrated in FIG. 4. FIG. 14 shows operations 1400 that may be executed in connection with the example of FIG. 4.

In the example shown in FIG. 4, the exemplary architecture 400 (e.g., of the wearable display device 102 and/or the master device 304) generally includes: a virtual environment reconstruction module 402; a content output manager 404; and a streaming device manager module 406. The virtual environment reconstruction module 402 may include: a three-dimensional reconstruction and tracking module 408; a virtual environment model module 410; an output device location and characteristics detector 412; and an output evaluator module 414. The content output manager 404 may include a content deconstruction module 416 and a signal streamer module 418. The streaming device manager module 406 may include a device connector module 420 and a test signal generator module 422.

A virtual model of the environment and output devices may be constructed by the virtual environment reconstruction module 402 (e.g., at operation 1402). Depending on the capabilities of the wearable device (e.g., augmented reality device capabilities), the virtual model can include details about the environment geometry that, for example, is captured and reconstructed from camera and/or depth sensors. Additionally, or in the alternative, the virtual model can be a model of output device locations and/or device characteristics. The virtual model may be accurate and/or detailed enough to enable the wearable display device 102 to decide how the content should be divided to various output devices. Besides being used for content mapping, the virtual model may be used in evaluating the accuracy of the desired output configuration. In turn, this evaluation may be used to fine tune the virtual model which may enable continuous optimization of the output performance of the one or more devices included in the digital experience presentation.

In FIG. 4, the wearable display device provides access to the RGB-D data observed by the RGB-D sensor embedded with the wearable display device. In some embodiments, the RGB-D sensor may be coupled to the wearable display device. In some embodiments, as a first step, the RGB-D data is used for reconstructing a three-dimensional model of the environment and/or to track device location in the environment. Three-dimensional reconstruction of the environment can be carried out with an RGB-D based reconstruction method, such as the RGB-D based reconstruction methods employed in Microsoft's KinectFusion or Point Cloud Library (PCL). As will be discussed below, the RGB-D data, as well as audio data received from microphones that may be embedded with and/or coupled to the wearable display device, may be used for detecting new devices (e.g., devices not previously incorporated into the presentation of the digital experience) and/or to observe the performance of the combined device output.

In some embodiments, the wearable display device polls for available output devices (e.g., at operation 1420). For example, the device connector module 420 may search (e.g., by broadcasting connection request signals) for devices that are capable of outputting streamed media and/or that allow control of the device in a manner which can contribute to the overall digital experience (e.g., contribute to the presentation of an augmented reality experience). Devices that can be used for output include, for example, different display devices, audio devices, projectors, smart and/or projected lighting solutions, and other suitable devices. Device polling can be performed using any available streaming protocol and wireless communication technology, such as AirPlay, Miracast, WiDi, Chromecast, DLNA, etc. running on top of Wi-Fi, Bluetooth, etc., or it can be a dedicated connection and control protocol used for other than multimedia devices, such as smart lighting. As illustrated in FIG. 4, the device connector module 420 may continuously poll for available output devices, for example, during a duration of the presentation of the digital experience.

In some embodiments, the wearable display device connects to the output devices (e.g., at operation 1430). In this example, the device connector module 420 is responsible for initiating and maintaining connections with the devices that have been found from the environment. The device connector module 420 provides streaming addresses to the signal streamer module 418, so that the signal streamer module 418 can then send content to the connected output devices. In some embodiments, the device connector module 420 is alternatively or additionally responsible for terminating connections with the output devices when they are no longer needed (e.g., due to poor output performance) and/or when the digital experience is terminated (e.g., finished streaming or a control to cease streaming is received by the wearable display device). Each device connection may be sustained using the streaming protocol that was used at the time that the device was initially discovered.

The test-signal generator module 422 may construct a test signal for a new device (e.g., a device for which the wearable display device has not yet generated a test signal) (e.g., at operation 1440). To this end, when a new output device has been found and the device connector module 420 has established connection with the new output device, the device connector module 420 passes the information pertaining to the new device (e.g., device type, streaming capabilities) and known characteristics to the test signal generator module 422. In some embodiments, test signal generator module 422 is responsible for generating test signals that are sent to the connected output devices in order to detect their locations and/or characteristics. The test signal may be, for example, a visual signal such as a fiducial marker or markers sent to a display device and/or a distinctive audio signal sent to an audio device. Examples of fiducial markers that may be used in detection of the locations and/or the characteristics of the connected output devices include the optical fiducial markers described by Fei et al. in U.S. Pat. No. 8,988,343, entitled "Method of Automatically Forming One Three-Dimensional Space with Multiple Screens," issued Mar. 24, 2015, the entirety which is incorporated herein by reference. As described, in part, by Fei et al. in U.S. Pat. No. 8,988,343, a QR code emblem of known fixed size, which encodes a unique display ID assigned to a display device, may be captured in an image by a camera and analyzed to determine position and orientation of the particular display device. Additionally, or in the alternative, the test signal can be part of the content sent to the device. In some embodiments, the test signal is additionally or alternatively in the form of a special signal signature hidden or mixed along with the content. Other test signals may also be used to identify the device that outputs the test signal as well as to detect device location and/or characteristics of the device that outputs the test signal.

The content deconstruction module 416 may (e.g., at operation 1450) construct content elements that are to be sent to the connected output devices. As illustrated in FIG. 4, the content deconstruction module 416 may break down content to individual elements (e.g., individual content elements of multimedia data, such as, audio, video, animation, images, etc.). An application generating the content to be output, or a separate module inspecting the content to be output, may deconstruct the content and/or map individual content elements to each available output device.

In some embodiments, mapping of content elements with the output devices is based on the virtual model of the environment, including the output device characteristics. Content elements are distributed to the output devices based on their virtual locations and output device capabilities so that they form a coherent experience which is expanded from a single device to all output devices in use. For example, this content mapping can be performed with the following goals:

Using all audio output devices in combination to create a rich spatial soundscape.

For visuals, the following output device related topics can be taken into account: color bleeding between devices, occlusion and masking between elements on different displays, accommodation distances to different display elements etc.

Adjusting of other output elements, such as tuning of controllable lighting to match the required mood and color balances of the experience.

In some embodiments, augmented reality and/or virtual reality content need not be constructed in a way where a separate display requires separate content elements. Rather, in accordance with some embodiments, content is distributed automatically and dynamically to all available displays. For example, a virtual world can be projected to all display surfaces creating an immersive rendering which takes into account a user's viewpoint. For an example augmented reality experience, distribution of content elements may be based on natural eye accommodation distances, foreground/background division, and/or handling of occlusions.

In addition to creating output elements to be sent to different devices, timing of different elements may be adjusted in order to synchronize the playback on different devices (e.g., at operation 1450). Delays of the different output devices may be monitored in a generally continuous manner. Information about the device latencies may be maintained (e.g., stored in memory) as one characteristic parameter associated with device information in the virtual model.

The approach used to deconstruct the content may depend on the types of devices in use and the content type, e.g. virtual reality, augmented reality etc.

The content deconstruction module 416 may combine the test and content signals (e.g., at operation 1460). In addition to the mapping of the content elements to each output device, the content deconstruction module 416 may also be responsible for defining how generated test signals are sent to the output devices. The content deconstruction module 416 may create, for example, all individual streams to be sent to the output devices by combining potential test signals and content based on the output device status, and also fine tunes the timings of elements according to the device latencies.

As a result of this operation, content to the active output device that has just been connected, and test signals to the output device just connected, are sent concurrently. One goal of sending content and test signals concurrently may be to minimize artefacts caused by new device connections to the complete experience. The test signal may be selected to be a natural part of the normal content, for example ambient sounds or abstract visuals to match the content or picked from the content. Such approaches may be used in lieu of sending distinct test signals. Content output may be enabled at the same time as test signals are sent to the new devices, so that the experience does not pause while test signals are being output by the new devices.

Test and content signals are sent out (e.g., at operation 1470). The content deconstruction module 416 requests the signal streamer module 418 to send content streams to all of the output devices in use. The signal streamer module 418 sends out the streams based on the output device addresses received from the device connector module 420.

The virtual environment reconstruction module 402 may observe the output from the devices. To this end, the device sensors capture data from the environment. In one example, this includes capturing RGB-D data from at least one RGB-D sensor and audio with at least one microphone array. Both may be embedded with the wearable display device (e.g., the master device). Captured data is used by output device location and characteristics detector module 412 as well as the output evaluator module 414. In some embodiments, the device location and characteristics detector module 412 uses captured data to detect device locations and characteristics by isolating and analyzing test signals generated/constructed for the new devices by the test signal generator module 422 (e.g., in earlier operations).

The device location and characteristic detector module 412 may observe test signals to estimate output device locations and characteristics (e.g., at operation 1490). The device location and characteristics detector module 412 may analyze the data captured by the device sensors in order to detect locations and characteristics of the output devices found in the environment. Based on the test signal detection, an initial estimate is made as to where the output device is located and its characteristics. These include for example:

Audio speaker locations, channel mapping, volume levels etc.
Display surface alignments, resolutions etc.
Projected lighting: projector mapping on scene geometry.
Lighting: light sources, available tones, intensities, control channels etc.

In one example, the locations of the audio devices are detected with acoustic source localization techniques. For this purpose, each audio output channel of the audio output device is set to output an individual test signal, which is then isolated. The location of the audio output device may be determined using triangulation techniques, and/or by analyzing the time differences of signals arriving at different microphones of the microphone array (e.g., by using the known speed of sound in the environment).

Sound calibration here differs from the sound calibration of a surround system in that the sound calibration executed by the disclosed system is used to resolve three-dimensional locations of the speakers as well as average volume levels. Sound calibration on surround systems, in contrast, focuses more on avoiding speaker crosstalk by adjusting relative volume levels between speakers measured from main listening spots. Accurate speaker location detection is not needed in such surround systems. In the disclosed system, the user may be free to move around in the environment, so the model of the output constructed based on the calibration may enable continuous mapping of virtual sound sources to the speakers in various three-dimensional locations in the physical environment.

Display locations, dimensions, aspect ratio and resolution may be detected by sending detectable visual calibration images, such as fiducial markers, to the displays. Fiducial markers can be detected from a camera image provided, for example, by the RGB-D camera. Since such markers may be formed from known image elements, the location and orientation of the displays can be calculated by solving transformations that result in the same distortions to the known image elements as what is being observed. Any known marker detection and tracking, markerless image detection, simple marking color segmentation or any other visual detection method may be used for achieving this.

Traditional monitor calibration differs from the observations executed by the exemplary system. Monitor calibration traditionally focuses solely on color calibration, whereas the exemplary system operates to solve display spatial dimensions (size, location, orientation). Like the operations associated with sound calibration noted above, the exemplary system generates a three-dimensional model of the display surfaces that are available in the physical environment so that as user moves around in the environment, graphics displayed on the available display devices can be registered with the user.

Locations of the light sources that may be detected using a control signal from the master device that can be detected by observing light reflecting from surfaces normal to the three-dimensional reconstruction of the environment and changes of light intensities on these surfaces as controllable lighting is turned on. Optimization method for constructing best estimates for the light locations may be based on comparing multiple samples on several surface points with multiple normal directions.

Furthermore, all possible output types that can contribute to the augmented reality experience may be connected and calibrated (e.g., at operation 1490). Each non-traditional audiovisual device used to enhance the experience is connected and calibrated with methods most effective and accurate to the device type.

The output evaluator 414 may observe the content output from the devices (e.g., at operation 1492). In this operation, the output evaluator module 414 receives, for example, captured data from the RGB-D sensor and the microphone array. In some embodiments, one objective of this operation is, for example, to compare how the actual output observed compares with the desired output. In some embodiments, using the virtual environment model, it is possible to predict how the output of each output device should be observed. The analysis may be based on how images appear on the displays. For example, the analysis may be based on the accuracy of the timing of appearance of the images. This may be determined, for example, by comparing image buffers associated with the transmitted content stream with image buffers associated with the received content stream acquired during operation 1480. Further, by using audio buffers, sound levels and directions from different audio output devices may be determined. Still further, the overall light intensities in the environment may be compared using buffers.

If deviations between observations and desired results are found, a request to the virtual environment model module 410 is sent to adjust device parameters or locations. This iterative optimization makes the virtual environment model dynamic and/or adjustable to changes in the environment as well as changes in output device performance.

In some embodiments, after the output evaluator module 414 has done an output analysis and requested an update of the parameters and locations of the output devices, the virtual environment model 410 is inspected to detect output devices which are not performing as expected, or that no longer have significant contribution to the overall experience. These devices are removed from the collection of the output devices in use. Pursuant to removing an output device, the streaming device manager module 406 receives information that one or more of devices are no longer needed and/or not meeting desired performance parameters. After receiving this information, the streaming device manager module 406 terminates the connection with the output device and marks the device so that it is not reconnected (e.g., updates a connection permission parameter corresponding to the device and/or stores a flag in memory as an indicator to not connect to the flagged/marked device).

Figure 5:
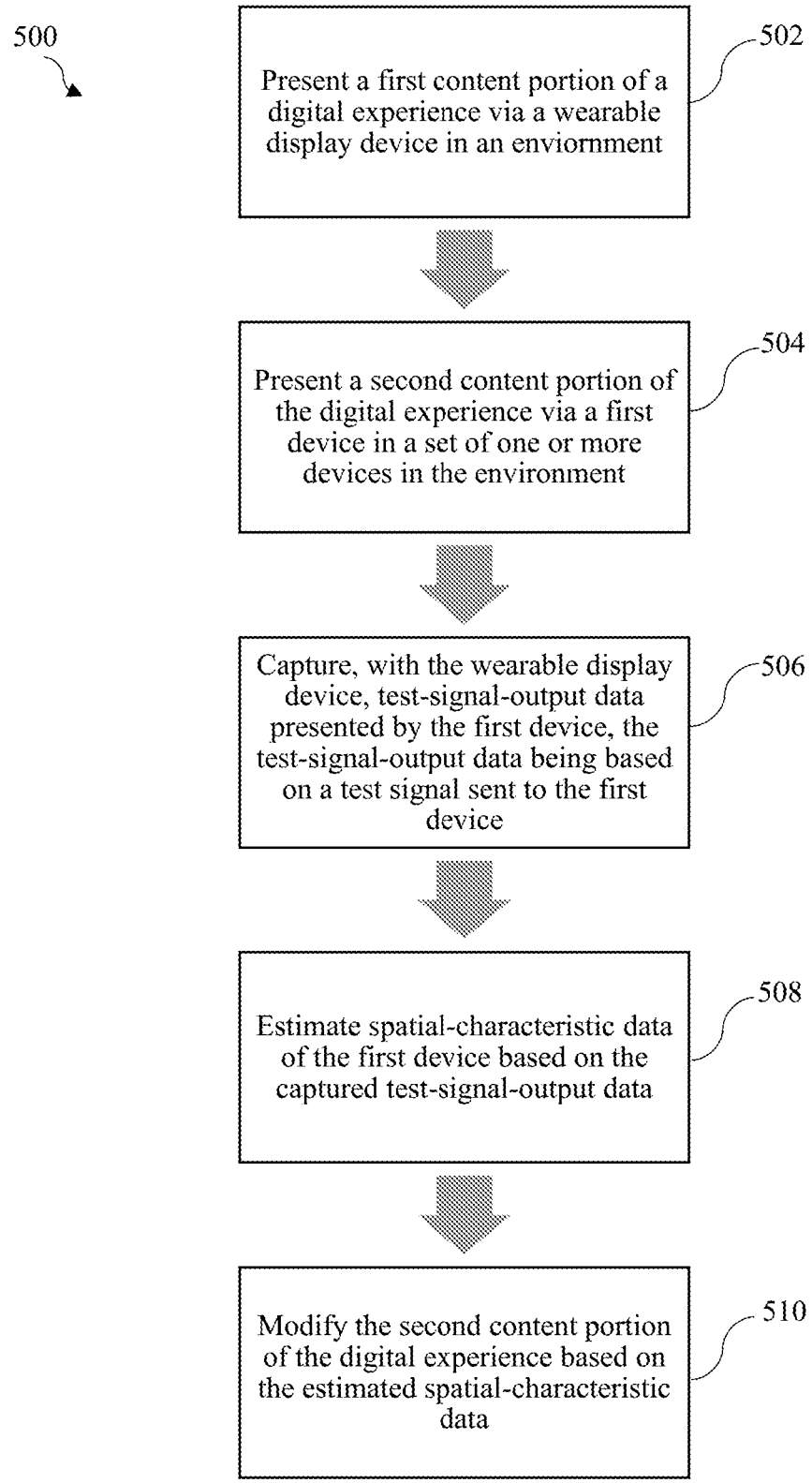
FIG. 5 is a flow chart of an exemplary method for configuring a multi-device digital experience.

FIG. 5 is a flow chart of an exemplary method 500 for implementing a multi-device digital experience.

In step 502, a wearable display device (e.g., the wearable display device 102) that is in an environment (e.g., the environment 110) presents a first content portion of a digital experience. For example, the wearable display device 102 may present the first content portion of the digital experience (e.g., projecting the first content portion of the digital experience onto an optical-see-through display coupled to the wearable display device 102) after receiving a command (e.g., from a remote device and/or from the user wearing the wearable display device 102) to present the first content portion and/or after entering the environment 110. As another example, the wearable display device 102 may present the first content portion of the digital experience before entering the environment 110 and/or before detecting, connecting to, and/or streaming content to other devices (e.g., the device 1 104, the device 2 106, and/or the device 'n' 108) in the environment 110.

In step 504, a first device (e.g., the device 1 104) in a set of one or more devices that are in the environment presents a second content portion of the digital experience. For example, the device 1 104 may present the second content portion of the digital experience which may be streamed to the device 1 104 from the wearable display device 102.

In step 506, the wearable display device captures test-signal-output data presented by the first device (e.g., using one or more of an RGB-D camera and a microphone array), the test-signal-output data being based on a test signal sent to the first device. For example, the wearable display device 102 may capture the test-signal-output data presented by the device 1 104, the test-signal-output data being based on the test signal sent to the device 1 104 via the wearable display device 102.

In step 508, spatial characteristic data of the first device is estimated based on the captured test-signal-output data. For example, output device location and characteristic detector module 412 may receive a description of the test signals and of the corresponding output device. As a result of characteristics/elements of the test signal being known (e.g., stored in memory and accessible by the device location and characteristic detector module 412), the spatial-characteristic data may be estimated for the first device based on the captured test-signal-output data. Further, characteristics of the sensors, the wearable display device, and/or the environment may be known, and as a result, of some of these characteristics being known, the spatial-characteristic data may be estimated. For example, known distances, and/or angles relative to a common reference line, of particular microphones of the microphone array may enable triangulation methods to be employed to estimate the spatial-characteristic data of an audio output device.

In step 510, the second content portion of the digital experience is modified based on the estimated spatial-characteristic data. For example, the wearable display device may modify the second content portion of the digital experience based on an estimation that the first device is within a threshold distance from the wearable display device. As a further example, the closer that the first device is to the wearable display device based on the estimated spatial-characteristic data, the louder the second content portion of the digital experience may be presented by the first device.

Figure 6:
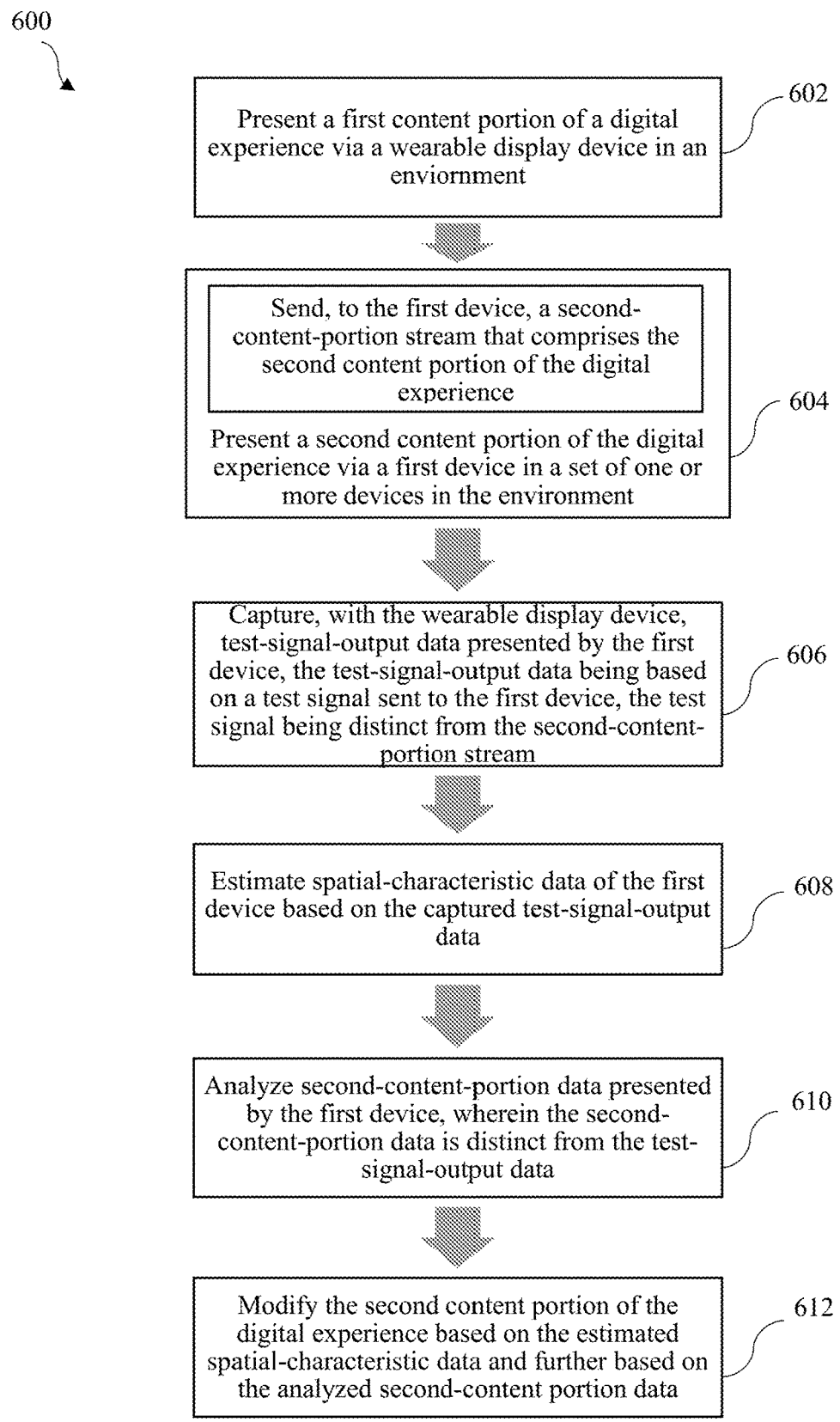
FIG. 6 is a flow chart of another exemplary method for configuring a multi-device digital experience.

FIG. 6 is a flow chart of an exemplary method 600 for implementing a multi-device digital experience.

Step 602 of the exemplary method 600 of FIG. 6 is the same as step 502 of FIG. 5. Accordingly, step 602 is carried out as described in the description corresponding to step 502.

In step 604, a first device (e.g., the device 1 104) in a set of one or more devices that are in the environment presents a second content portion of the digital experience. To present the second content portion of the digital experience, a second-content-portion stream that comprises the second content portion of the digital experience is sent to the first device. For example, the wearable display device 102 may send the second-content-portion stream that comprises the second content portion of the digital experience to the device 1 104 which may enable the device 1 104 to present the second content portion.

In step 606, the wearable display device captures test-signal-output data presented by the first device. In step 606, the test-signal-output data is based on a test signal sent to the first device, the test signal being distinct from the second-content-portion stream.

Step 608 of FIG. 6 is the same as step 508 of FIG. 5. Accordingly, step 608 is carried out as described in the description corresponding to step 508.

In step 610, the second-content-portion data presented by the first device is analyzed. Further, in step 610, the second-content-portion data is distinct from the test-signal-output data.

In step 612, the second content portion of the digital experience is modified based on the estimated spatial-characteristic data and further based on the analyzed second-content-portion data.

Figure 7:
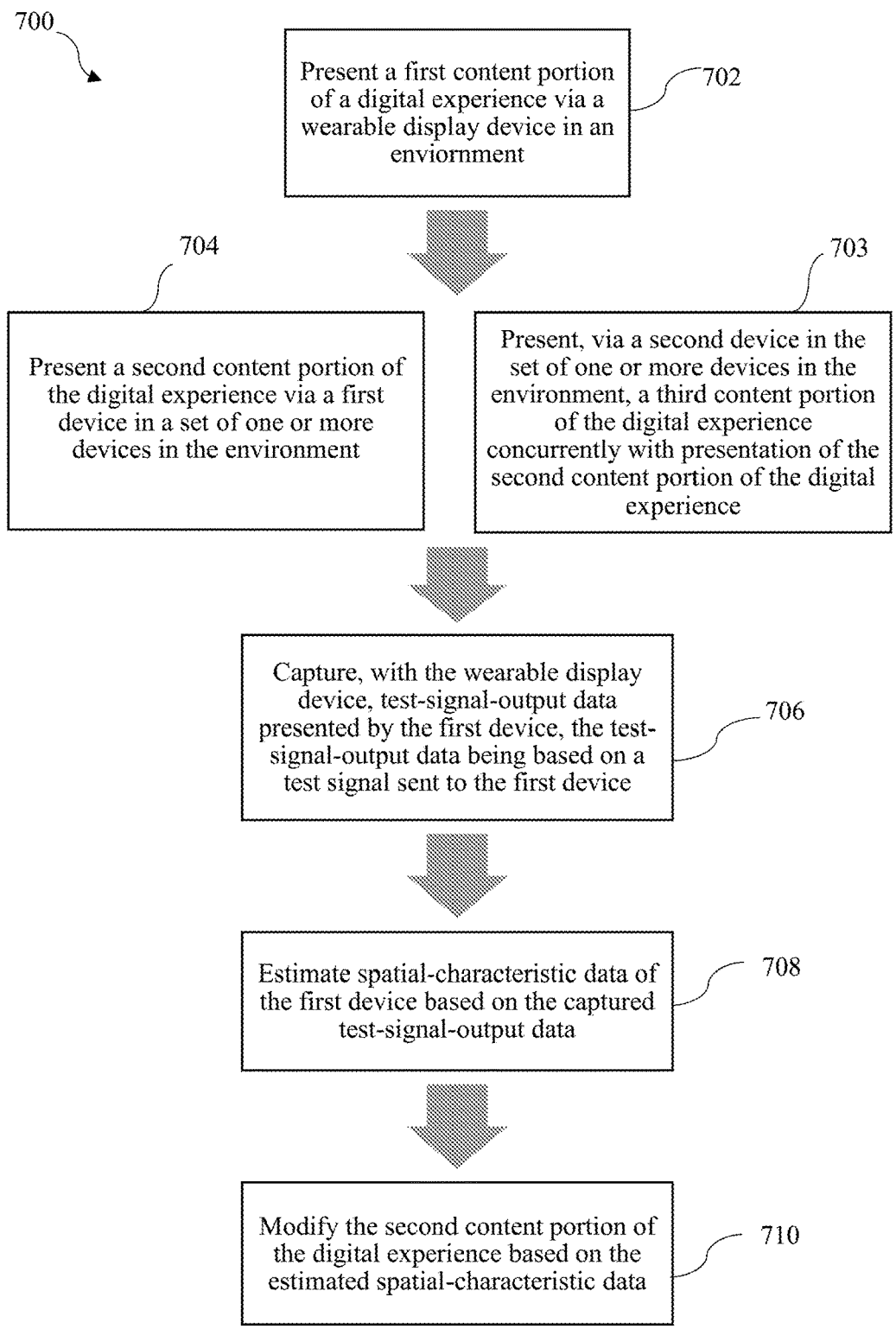
FIG. 7 is a flow chart of yet another exemplary method for configuring a multi-device digital experience.

FIG. 7 is a flow chart of an exemplary method 700 for implementing a multi-device digital experience. The exemplary method 700 of FIG. 7 is the same as the exemplary method 500 of FIG. 5, except that the exemplary method 700 further includes step 703. Accordingly, in the exemplary method 700, steps 702, 704, 706, 708, and 710 are carried out as described in the description of corresponding steps 502, 504, 506, 508, and 510 of the exemplary method 500 of FIG. 5.

In step 703, a third content portion of the digital experience is presented, via a second device in the set of one or more devices in the environment, concurrently with presentation of the second content portion of the digital experience via the first device. For example, both of the device 1 104 and the device 2 106 may present respective content portions of the digital experience at the same time.

Figure 8A:
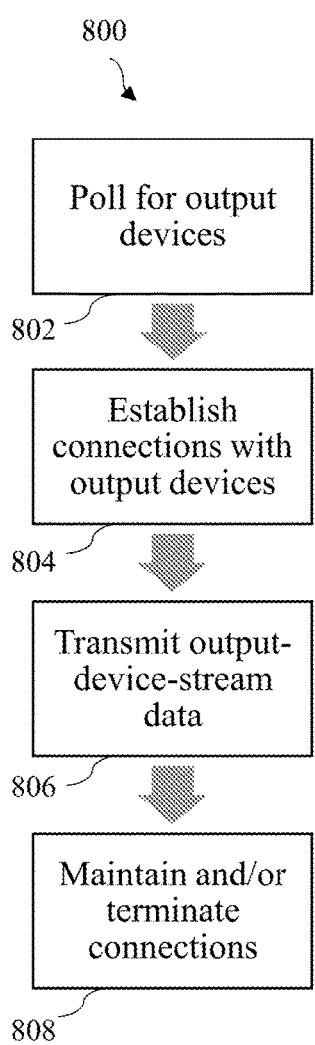
FIG. 8A is a flow chart of an exemplary method for identification and/or connection management of one or more output devices employed in a multi-device digital experience configuration.

FIG. 8A is a flow chart of an exemplary method 800 for identification and/or connection management of one or more output devices employed in a multi-device digital experience configuration.

In step 802, a wearable display device polls for output devices. For example, a device connector module (e.g., the device connector module 420) may broadcast one or more inquiry response signals that may enable detection of available output devices by the device connector module. In some embodiments, the device connector module 420 may be configured to poll for output devices within a proximity range (e.g., within a predetermined range of distances that may be based on a broadcast range associated with the communication protocol used). In some embodiments, the proximity range is commensurate with a boundary of the environment.

In step 804, the wearable display device establishes connections with output devices. For example, after the device connector module detects the one or more available devices (e.g., within the predetermined range), the device connector module may pair with one or more of the available output devices.

In step 806, the wearable display device transmits output-device-stream data. For example, the device connector module may transmit output-device-stream data to the content output manager which may enable the signal streamer to appropriately stream content signals, test signals, and/or combined content/test-signal streams to corresponding output devices. The output-device-stream data may include one or more connection details of the output device, such as, for example, address information, clock information, and/or other information associated with the output device that may aide the signal streamer in communicating with the output device.

In step 808, the wearable display device maintains and/or terminates connections with one or more connected output devices. For example, a virtual environment model module (e.g., the virtual environment model module 410) may detect unused and/or underperforming output devices. The virtual environment model module may transmit a request to drop (e.g., remove from incorporation in the presentation of content of the digital experience) the unused and/or the underperforming devices, for example, to the device connector module. As a result of receiving the drop request, the device connector may terminate connection with the corresponding devices.

Figure 8B:
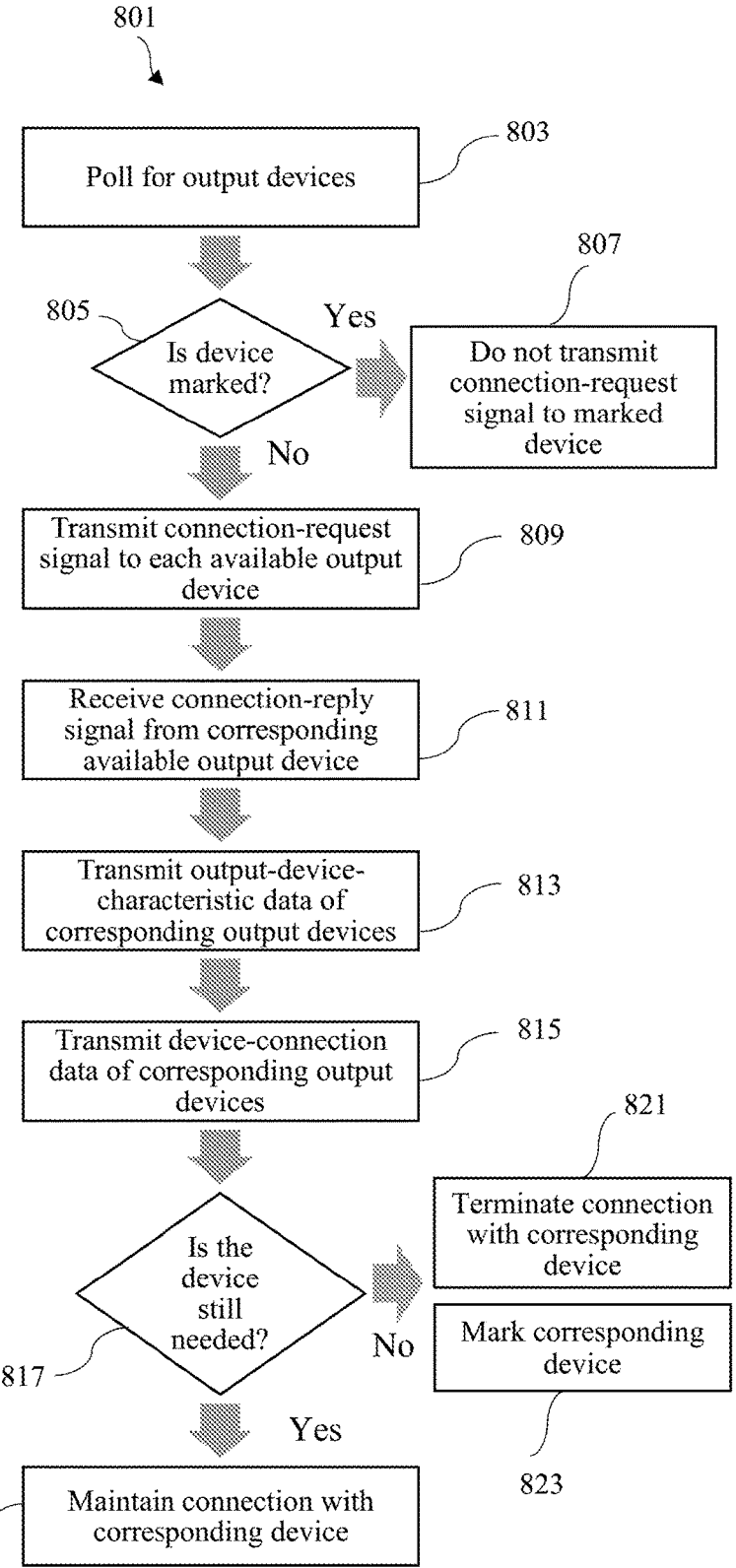
FIG. 8B is a flow chart of an another exemplary method for identification and/or connection management of one or more output devices employed in a multi-device digital experience configuration.

FIG. 8B is a flow chart of an another exemplary method 801 for identification and/or connection management of one or more output devices employed in a multi-device digital experience configuration.

In step 803, as described above in connection with step 802 of the exemplary method 800, the wearable display device polls to detect available output devices.

In step 805, the wearable display device checks if the detected devices are marked (e.g., devices having previous connections terminated due to not being used and/or underperforming that have data indicating not to connect to the device). For each device a determination is made that the device is marked, the example method proceeds to step 807 and does not transmit connection-request signals to the marked device.

For each detected device that is not marked, the method proceeds to step 809 and the device connector module transmits a connection-request signal to each of the detected devices.

In step 811, the device connector module may receive a connection-reply signal from the corresponding available output device. Receiving the connection-reply signal may enable the device connector module to establish a connection with the corresponding output device.

In step 813, the device connector module transmits output-device-characteristic data of corresponding output devices. In some embodiments, the device connector module transmits output-device-characteristic data of newly detected/connected output devices to the test signal generator. The output-device-characteristic data transmitted to and/or received by the signal generator may enable more accurate detection of the output devices when presenting the corresponding generated test signal.

Step 815 is the same as step 806 is the exemplary method of 800 of FIG. 8A. Accordingly, step 815 is carried out in the same manner as described for step 806.

In step 817, a determination is made of whether an output device is still needed. For example, the virtual environment model module may access data corresponding to underperforming and/or unused devices (e.g., data representing past performance history, connectivity issues, device specifications/capabilities corresponding to one or more content portions of the digital experience, and/or any other suitable information for aiding in determination of a need for an output device in presentation of a digital experience), to make a determination of whether the device is still needed in the presentation of the digital experience. If the device is still needed, the method may proceed to step 819 and the connection of the wearable display device with the device may be maintained.

If a determination is made that the device is no longer needed in the presentation of digital experience the method may proceed to step 821. In step 821, the connection with the device is terminated. As set forth in step 808 of FIG. 8A, the virtual environment module may transmit a drop request and the device connector module may terminate connection with the device.

In step 823, the device determined to no longer be needed is marked so that the device is not connected to again when the device connector module polls for new devices.

FIG. 9 is a flow chart of an exemplary method 900 for test-signal generation/transmission for one or more output devices employed in a multi-device digital experience configuration.

In step 902, the test signal generator receives output-device-characteristic data of a corresponding output device. The output-device-characteristic data may enable the test signal generator to generate test signals that are suited for a device having the characteristics represented by the data. For example, output-device-characteristic data may include information corresponding to specifications/capabilities of the output device (e.g., resolution, brightness, screen type (e.g., plasma, LED, LCD, etc.) of a display screen presenting the test signal of the corresponding output device).

In step 904, the test signal generator generates a test signal for the corresponding output device.

In step 906, the generated test signal and/or detection data is transmitted. For example, the test signal generator transmits the generated test signal to the content deconstruction module.

FIG. 10 is a flow chart of an exemplary method 1000 for streaming a content signal, a test signal, and/or a combined content/test-signal stream for presentation by an output device employed in a multi-device digital experience configuration.

In step 1002, device-connection data of a corresponding output device is received. For example, the device-connection data may be received by a signal streamer (e.g., the signal streamer 418).

In step 1004, a content signal, a test signal, and/or a combined content/test-signal stream may be received. For example, a content deconstruction module (e.g., the content deconstruction module 416) and/or the signal streamer may receive the content signal, the test signal, and/or the combined content/test-signal stream.

In step 1006, the received content signal, the received test signal, and/or the received combined content/test-signal stream may be transmitted for presentation by the corresponding output device. For example, the signal streamer may receive the combined content/test-signal stream from the content deconstruction module and/or may transmit the received combined content/test-signal stream for presentation by the corresponding output device.

Figure 11:
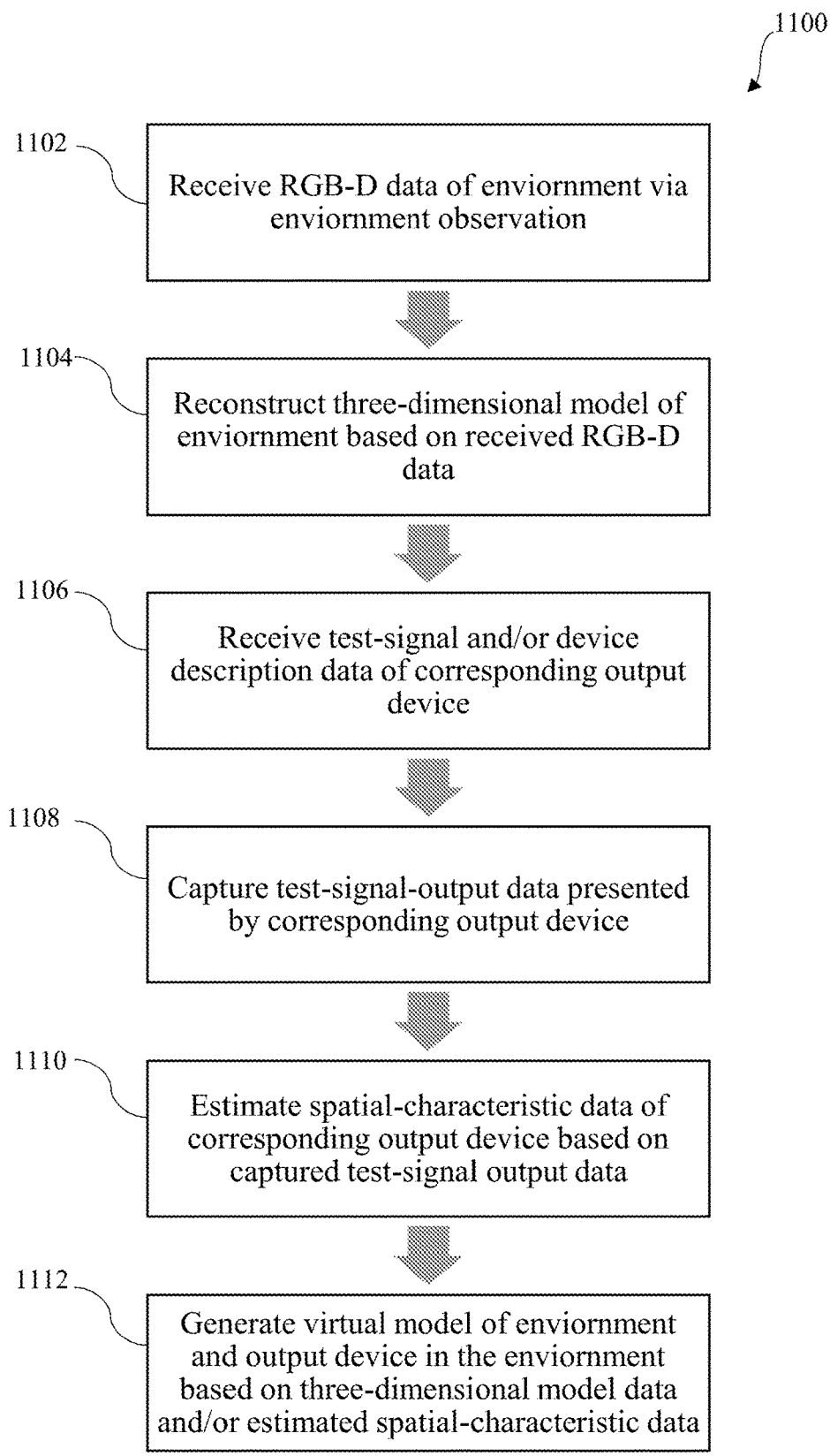
FIG. 11 is a flow chart of an exemplary method for generating a virtual model of an environment and/or of one or more output devices in the environment, the one or more output devices being employed in a multi-device digital experience configuration.

FIG. 11 is a flow chart of an exemplary method 1100 for generating a virtual model of an environment and/or of one or more output devices in the environment, the one or more output devices being employed in a multi-device digital experience configuration.

In step 1102, RGB-D data of the environment (e.g., the environment 110) may be received via an environment observation. For example, RGB-D data of the environment may be received by a 3D reconstruction and tracking module (e.g., the 3D reconstruction and tracking module 408). In some embodiments, the RGB-D data of the environment is a result of an observation of the environment via an RGB-D sensor (e.g., the RGB-D sensor 316 and/or the RGB-D camera 1627).

In step 1104, a three-dimensional model of the environment is reconstructed based on the received RGB-D data. For example, the 3D reconstruction and tracking module may reconstruct the three-dimensional model of the environment.

In step 1106, a test-signal and/or device description data of corresponding output device is received. The test-signal and/or the device description data of the corresponding output device may be by the signal streamer which may use the device description data to enable the streaming of the test signal to the corresponding device.

In step 1108, test-signal-output data presented by the corresponding output device is captured. For example, as a result of the streaming of the test signal from the signal streamer to the corresponding output device, the corresponding output device may present (e.g., playback) test-signal-output data that may be captured by one or more sensors coupled to and/or embedded in the wearable display device. The captured test-signal-output data may be images of the environment including presentation of the test-signal-output data by the corresponding device that were captured by the RGB-sensor (e.g., with the RGD-B camera).

In step 1110, spatial-characteristic data of the corresponding output device based on the captured test-signal output data may be estimated. For example, the estimated spatial-characteristic data may include a most-recently estimated location of the corresponding device with respect to the wearable display device and/or may include less-recent estimated locations of the corresponding device with respect to the wearable display device.

In step 1112 a virtual model of environment and output device in the environment based on three-dimensional model data and/or estimated spatial-characteristic data is generated.

Figure 12:
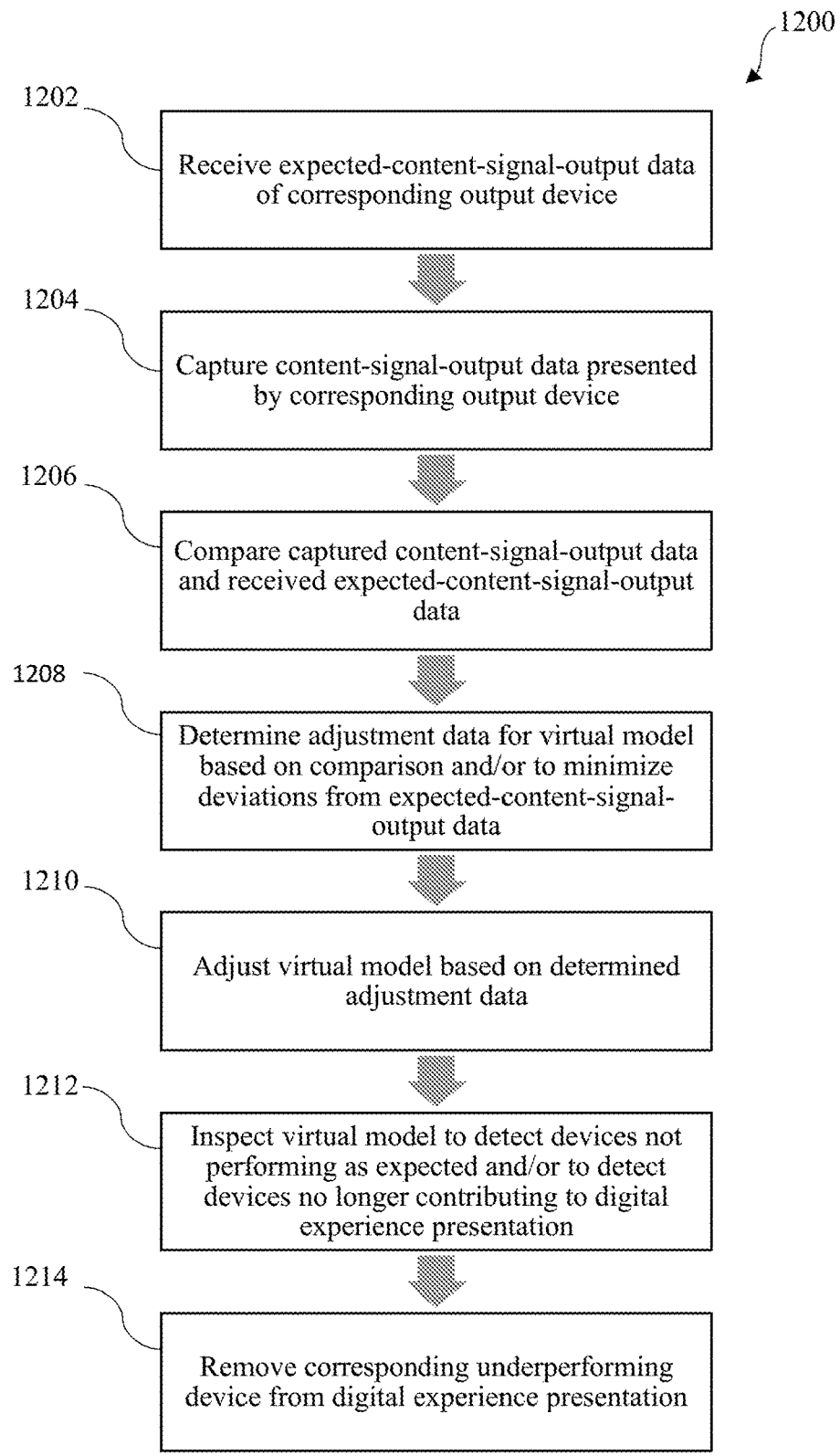
FIG. 12 is a flow chart of an exemplary method of adjusting a virtual model of an environment and/or of one or more output devices in the environment, the one or more output devices being employed in a multi-device digital experience configuration.

FIG. 12 is a flow chart of an exemplary method 1200 of adjusting a virtual model of an environment and/or of one or more output devices in the environment, the one or more output devices being employed in a multi-device digital experience configuration.

In step 1202, expected-content-signal-output data of corresponding output device is received.

In step 1204, content-signal-output data presented by corresponding output device is captured.

In step 1206, captured content-signal-output data and received expected-content-signal-output data is compared.

In step 1208, adjustment data for virtual model based on comparison and/or to minimize deviations from expected-content-signal-output data is determined.

In step 1210, the virtual model is adjusted based on determined adjustment data.

In step 1212, the virtual model is inspected to detect devices not performing as expected and/or to detect devices no longer contributing to digital experience presentation.

In step 1214, corresponding underperforming devices from digital experience presentation are removed.

Figure 13:
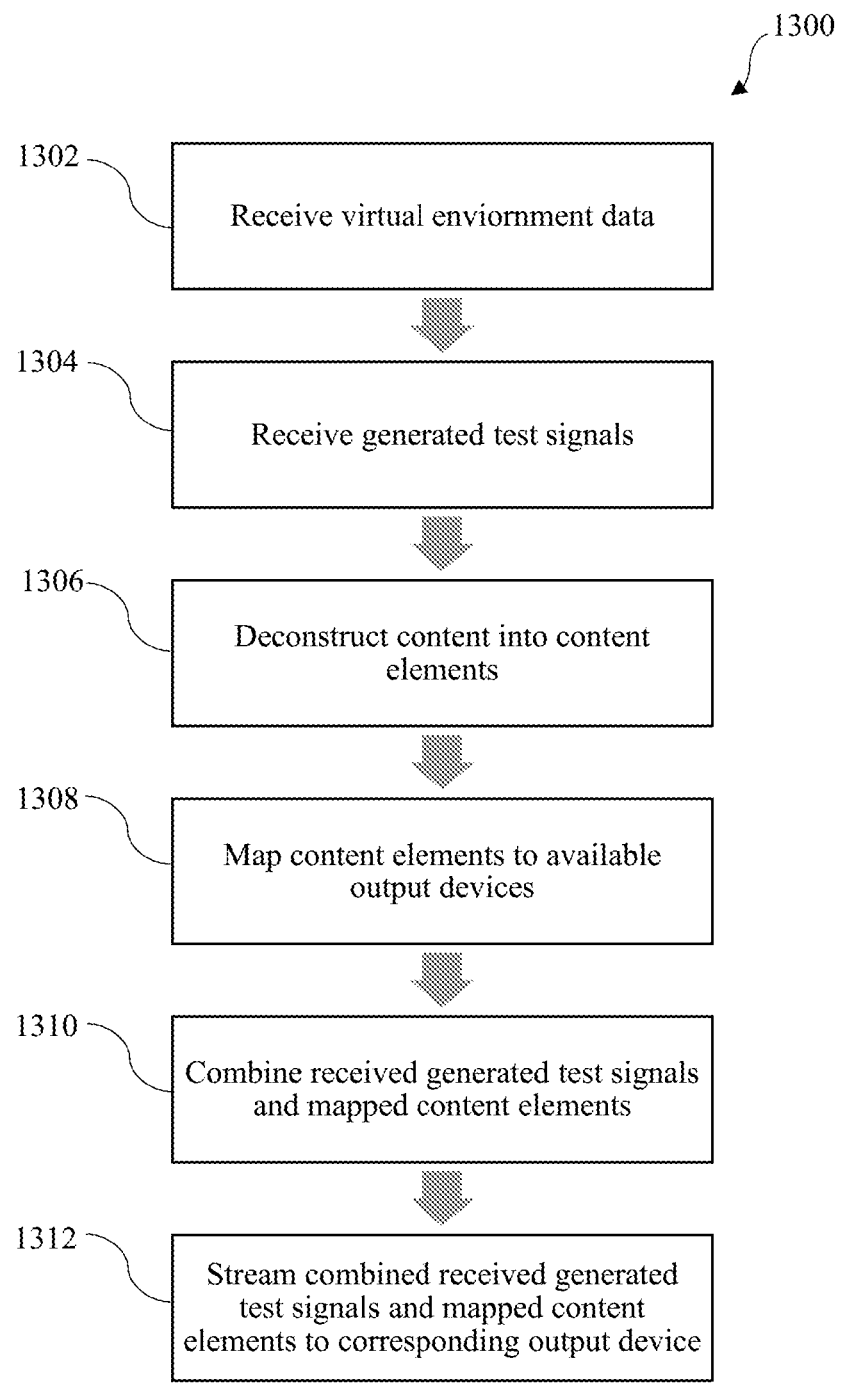
FIG. 13 is a flow chart of an exemplary method of output mapping of content portions of a digital experience to one or more output devices employed in a multi-device digital experience configuration.

FIG. 13 is a flow chart of an exemplary method 1300 of output mapping of content portions of a digital experience to one or more output devices employed in a multi-device digital experience configuration.

In step 1302, virtual environment data is received. For example, the virtual environment data may include information about the environment and the output devices connected to the wearable display device. The virtual environment data may be received by the content deconstruction module 416.

In step 1304, generated test signals are received. For example, the generated test signals may also be received by the content deconstruction module 416.

In step 1306, content is deconstructed into content elements. For example, content corresponding to the digital experience may be deconstructed into content elements so that individual elements of content of the digital experience can be mapped to a corresponding one of one or more output devices in communication with the wearable display device.

In step 1308, content elements are mapped to the available output devices. For example, the content deconstruction module may map the content elements to respective output devices available to stream portions of content.

In step 1310, received generated test signals and mapped content elements are combined. In some embodiments, the test signals and mapped content elements may be combined so that content is presented by the output device while also presenting the test signal to check and/or adjust output performance of the output device.

In step 1312, the combined received generated test signals and mapped content elements are streamed to the corresponding output device.

FIG. 14 is a flow chart of exemplary operations that may be executed to implement a multi-device digital experience configuration. FIG. 14 is described above in connection with FIG. 4.

Figure 15:
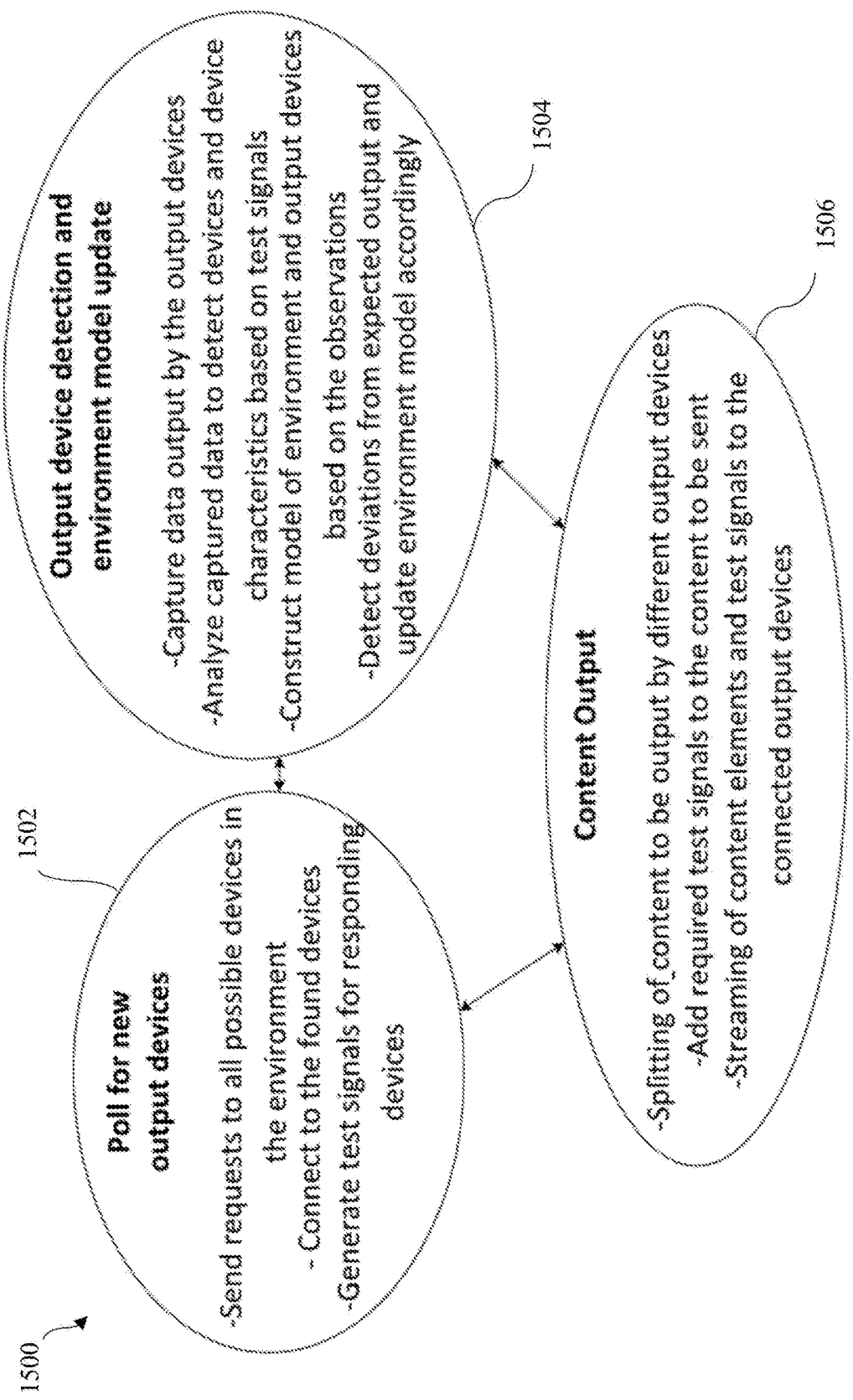
FIG. 15 illustrates exemplary processes that may be executed to extend a digital experience dynamically from an individual device to one or more output devices in an environment.

FIG. 15 provides an overview of example process 1500 that may be executed via a wearable display device (e.g., the wearable display device 102) and/or a master device (e.g., the master device 304) to extend a digital experience dynamically from an individual device (e.g., the wearable display device and/or the master device) to one or more output devices in an environment. In some embodiments, the wearable display device is the individual device. In some other embodiments, the master device is the individual device. FIG. 15 shows steps 1502, 1504, and 1506 of the process 1500, which may be executed as individual threads running in parallel, communicating via inter-process communication (e.g. shared memory and/or message passing).

In some embodiments, step 1502 includes the connection and detection of the output devices capable of outputting streamed content. In some embodiments, step 1504 includes calibration of detected output devices, step 1506 includes mapping of content to the output device configuration currently in use, and step 1504 further includes observation of output to validate the output mapping and to detect changes in the configuration. The example process 1500 shown in FIG. 15 may additionally or alternatively include one or more of the following operations:

Constructing a virtual model of the use environment and output devices in it;
Polling for new available output devices in the environment using any available protocol for media streaming or device control stream;
Connecting to the new output devices found from the environment;

Constructing test signals for the new devices, where the test signal is generated for use in detecting the device location, device characteristics, channel mappings etc.;

Constructing content elements to be sent to the devices that are known;

Combining test and content signals;

Sending out test and content signals;

Observing output from the output devices;

Analyzing observed test signals to estimate output device locations and characteristics;

Analyzing observed content output to detect deviations from desired output;

Adjusting the virtual model of the output environment to minimize deviations between desired output and true output in iterative manner; and Dropping output devices that are not needed or that do not perform acceptably.

In some embodiments, the exemplary scenarios and methods may be executed with a device that continuously inspects the environment with a RGB-D sensor and a microphone array. Such a device may include, for example, an augmented reality head mounted device. However, in other examples, the computing, communication between components included in the exemplary scenarios and/or that carry out the steps of the exemplary methods, and/or content management can be arranged in alternative ways. In these alternative architecture models, the system may be executed on some other local device (e.g., other than an augmented reality head mounted device). Alternative architectures include implementation on a cloud service, on a dedicated server accessed via network interface, and/or combinations of these alternatives. Also, in some embodiments, the communication between the wearable display device and/or the master device with output devices can be arranged in various ways. For example, the arrangement may use a dedicated content server to distribute the data to all devices instead of using the wearable display device and/or the master device to orchestrate (e.g., execute) the digital experience. Other architectures that may be implemented in accordance with some embodiments include: mobile device as a master device and/or a wearable display device; centralized storage of environment data; a dedicated server; and/or output device information embedded with corresponding output devices, each of which is described in more detail below.

Mobile Device as a Master Device and/or a Wearable Display Device—

In addition to augmented reality head mounted devices, any device capable of making RGB-D and microphone array observations of the environment, such as a mobile phone or tablet with embedded sensors could use the disclosed approach for extending output to one output device and/or multiple output devices. When using other mobile devices besides an augmented reality head mounted device, the user location may not always be known accurately, as there is no sensor that can be relied to track user location similar to the RGB-D sensor embedded with the augmented reality head mounted device. In some use cases, this may be addressed by dividing the process into two phases: 1) virtual environment model construction with output device detection done as a separate pre-processing step; and 2) then executing the actual application producing the experience as a separate step once the environment model and output device characteristics are known. Separating the processes in this manner may enable experiences in which the user is not constantly holding the mobile device in his/her hand. Rather, the user may have the device resting on a table, or have it in his/her pocket.

In this two-step process approach model, the application execution phase may use the output device combination configured in the first preprocessing step. In this manner, the device does not need to observe the environment while executing the application generating the experience.

Centralized Information of Environments—

Another alternative may include examples in which the virtual environment models are stored in a centralized fashion on a server accessed via network interface or as a cloud service. In this alternative architecture, environment models, together with known output device characteristics, are downloaded to the wearable display device or master device according to the detection of the environment, rather than running full output detection and character analysis on each execution. With this approach, processing power requirements of the local system may be reduced by, for example, tracking the device solely based on visual two-dimensional camera data instead of RGB-D data.

In this example, the environment models with output device characteristics may be constructed and stored on centralized data storage as a separate pre-processing step done per environment. Also, in cases where the user attempts to extend output using this approach where existing data is not available on the centralized data storage, the process may fall back to the process of constructing the virtual environment model during run-time.

Dedicated Server—

In addition to having the virtual environment model stored in a centralized fashion on a server side, the whole experience production could be performed on dedicated server, leaving the wearable display device or master device to a role of a one device controlling the experience. In this alternative architecture, the wearable display device or master device (e.g., augmented reality head mounted device, mobile device, etc.) would provide user tracking and gathering of user input, while the experience is being produced and streamed to all output devices including the master device from the dedicated server. This may allow use of augmented reality head mounted devices and mobile devices with lower processing capabilities to act as the wearable display device or master device.

Device Information Embedded with Output Devices—

Another alternative approach involves use of intelligent streaming capable devices that are aware of their own characteristics and relative locations and orientations at a detailed level. This may enable any use of any number of these devices without necessarily requiring a device detection phase. In addition to devices knowing their accurate locations, an alternative approach would be to use fiducial markers or direct object recognition based on visual two-dimensional data or RGB-D data to detect output device locations in the environment.

The disclosed systems and methods may be used with a wide array of different output device combinations in different environments and in different use cases. The environments where the disclosed systems may be used vary, for example, from small scale home environments to large scale public spaces of smart cities. In the home environment of today, many different types of streaming capable devices are available. Public spaces in smart cities may provide open access to output devices embedded in the environment, which could be harnessed for different augmented reality experiences.

Two different exemplary use cases are disclosed here. The first use case involves creating an entertainment type of augmented reality experience in a living room, and the second use case involves adding augmented reality information to a car and the car's surroundings.

Example Living Room Use Case—

In this first use case, the user may explore an augmented reality scene the user's friends have compiled. An optical see-through device worn by the user starts an application intended for augmented reality experience viewing, which also uses the disclosed system to extend augmented reality experiences from a head mounted device to the other output devices in the environment.

While the application may begin in a mode where the experience is displayed only locally on the augmented reality device, the disclosed systems may start polling the environment for different output devices that allow playback of streaming content on the device. Polling the environment results in dynamic output mapping connections to, for example, a large smart TV on the wall, media streaming capable projector used for projected lighting, and/or hi-fi system with 5.1 audio streaming.

The disclosed systems may send test signals to the devices while augmenting the main element of the augmented reality experience locally on the augmented reality device. Based on observation of the test signals output by the connected streaming devices, the disclosed system may construct a virtual model of the environment by adding estimations of the location and characteristics of the output devices to the virtual model of the environment reconstructed based on the RGB-D data received from an RGB-D sensor embedded with the augmented reality head mounted device. The augmented reality experience may include a three-dimensional character placed on a virtual hill top performing a birthday song and dance to a user who is having his birthday.

On the next execution round of the process, the system may use a large screen TV to display a background of the virtual environment in which the virtual character is located. Before streaming the background image, the system may detect the location at which the user is viewing the main character and add a black mask to match the area of the character. Due to the natural accommodation distances the system may render the background to the TV and the main character using the augmented reality head mounted device. A black mask added to the TV image may be used to minimize the color bleed from the background to the virtual character being rendered on a transparent display of the augmented reality head mounted device. Some other elements from the augmented reality scene may be rendered using the projected lighting projector to reproduce surfaces that match the natural accommodation distance. Other parts of the projected lighting system may project light patches showing the grass surface of the hill top and provide general mood lighting as if the room was lit up by mid-day sun casting hard shadows. Outputs of all audio devices in the room may be used for outputting the soundscape of the experience so that spatial relations of the virtual elements causing the sound match the visual representation.

Example of Adding Augmented Reality to a Car and its Surroundings—

In this use case the user steps into his car and launches an augmented reality application developed for use in the car. The augmented reality application uses the disclosed system to extend augmented reality experiences to the output devices embedded in the car.

When the disclosed system first starts, it begins by displaying virtual meters, which the user has defined as the ones he wants to see. The virtual meters may be displayed using custom graphics skins defined by the user. At the same time, the disclosed system polls for available output devices.

In this example, it finds an audio system of the car, a heads up display (HUD) projecting information to the windscreen, and headlights of the car that use projected lighting.

The augmented reality experience in this case may create an illusion that the user is in an ultimate muscle car, even though the car is in reality a very mediocre car.

The disclosed system may use the HUD to display parts of the engine to the user as if the car didn't have a hood over the engine, while also visualizing engine heat as a color coded overlay on the image of the engine. Projected head light highlighting may be used to paint the street surface and render optimal driving lines to the surface of the street. The augmented reality head mounted device may modify the look of the dashboard to match a muscle car theme. Further, the augmented reality system may use the audio system of the car to output heavier engine sounds and music.

Figure 16:
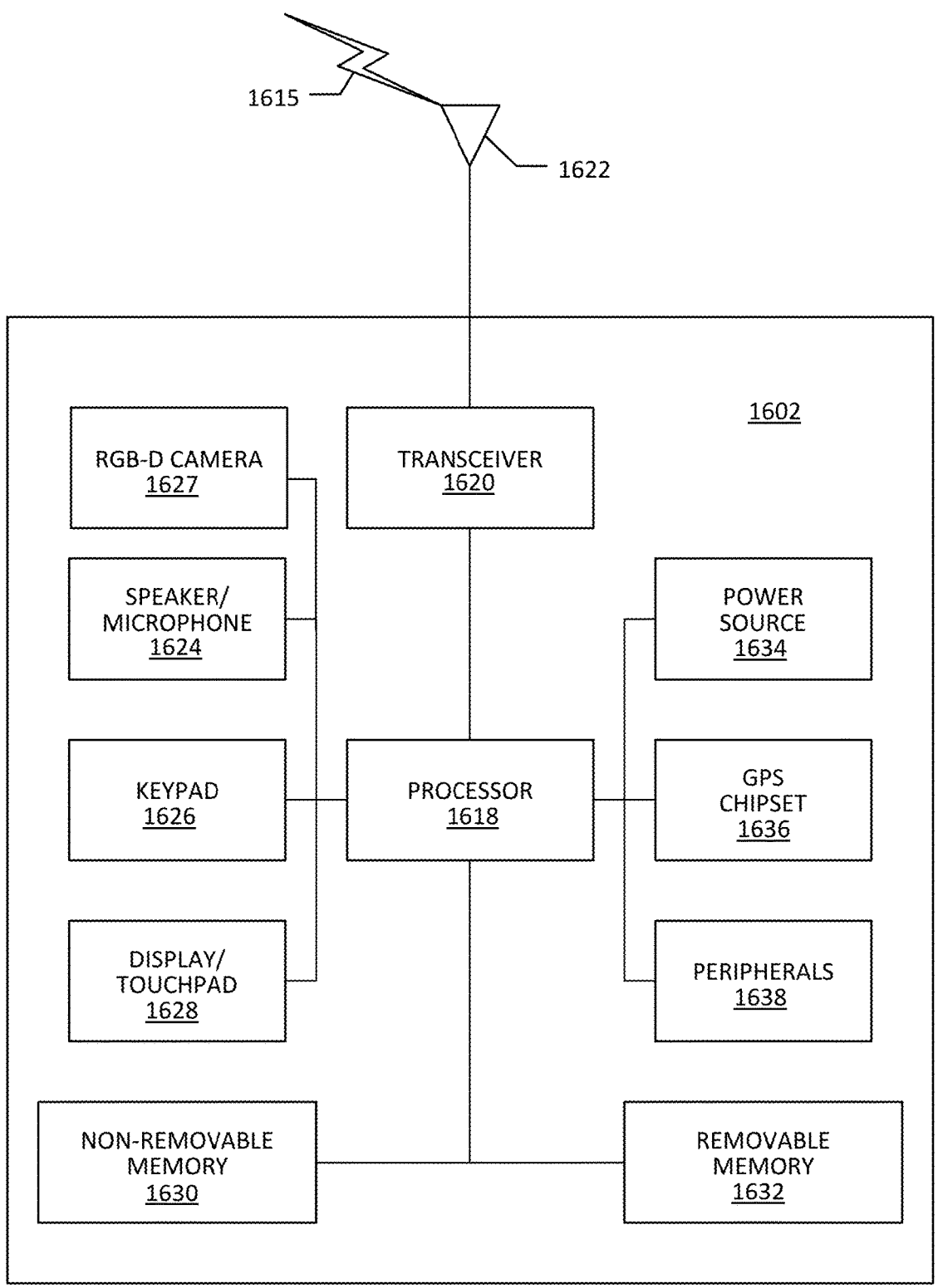
FIG. 16 is a block diagram of one example of a wireless unit that may be employed in a multi-device digital experience configuration.

With reference to FIG. 16, the systems and methods described herein may be implemented in a wireless transmit receive unit (WTRU), such as WTRU 1602 illustrated in FIG. 16. For example, a wearable display device and/or a master device, such as an augmented reality headset (e.g., smart glasses and/or head-mounted displays) or other augmented reality interface, may be implemented using one or more software modules on a WTRU.

As shown in FIG. 16, the WTRU 1602 may include a processor 1618, a transceiver 1620, a transmit/receive element 1622, audio transducers 1624 (e.g., including at least two microphones and at least two speakers, which may be earphones), a keypad 1626, a display/touchpad 1628, a non-removable memory 1630, a removable memory 1632, a power source 1634, a global positioning system (GPS) chipset 1636, and other peripherals 1638. It will be appreciated that the WTRU 1602 may include any sub-combination of the foregoing elements while remaining consistent with an embodiment. The WTRU may communicate with nodes such as, but not limited to, base transceiver station (BTS), a Node-B, a site controller, an access point (AP), a home node-B, an evolved home node-B (eNodeB), a home evolved node-B (HeNB), a home evolved node-B gateway, and proxy nodes, among others.

The processor 1618 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 1618 may perform signal coding, data processing, power control, input/output processing, and/or any other functionality that enables the WTRU 1602 to operate in a wireless environment. The processor 1618 may be coupled to the transceiver 1620, which may be coupled to the transmit/receive element 1622. While FIG. 16 depicts the processor 1618 and the transceiver 1620 as separate components, the processor 1618 and the transceiver 1620 may be integrated together in an electronic package or chip.

The transmit/receive element 1622 may be configured to transmit signals to, or receive signals from, a node over the air interface 1615. For example, the transmit/receive element 1622 may be an antenna configured to transmit and/or receive RF signals. In another example, the transmit/receive element 1622 may be an emitter/detector configured to transmit and/or receive IR, UV, or visible light signals, as examples. In yet another example, the transmit/receive element 1622 may be configured to transmit and receive both RF and light signals. To this end, the transmit/receive element 1622 may be configured to transmit and/or receive any combination of wireless signals.

Additionally, although the transmit/receive element 1622 is depicted in FIG. 16 as a single element, the WTRU 1602 may include any number of transmit/receive elements 1622. For example, the WTRU 1602 may employ MIMO technology. Thus, in one example, the WTRU 1602 may include two or more transmit/receive elements 1622 (e.g., multiple antennas) for transmitting and receiving wireless signals over the air interface 1615.

The transceiver 1620 may be configured to modulate the signals that are to be transmitted by the transmit/receive element 1622 and to demodulate the signals that are received by the transmit/receive element 1622. As noted above, the WTRU 1602 may have multi-mode capabilities. Thus, the transceiver 1620 may include multiple transceivers for enabling the WTRU 1602 to communicate via multiple RATs, such as UTRA and IEEE 802.11, as examples.

The processor 1618 of the WTRU 1602 may be coupled to, and may receive input data from, the audio transducers 1624, the keypad 1626, the RGB-D camera 1627, and/or the display/touchpad 1628 (e.g., a liquid crystal display (LCD) display unit or organic light-emitting diode (OLED) display unit). The processor 1618 may also output user data to the audio transducers 1624, the keypad 1626, and/or the display/touchpad 1628. In addition, the processor 1618 may access information from, and store data in, any type of suitable memory, such as the non-removable memory 1630 and/or the removable memory 1632. The non-removable memory 1630 may include random-access memory (RAM), read-only memory (ROM), a hard disk, or any other type of memory storage device. The removable memory 1632 may include a subscriber identity module (SIM) card, a memory stick, a secure digital (SD) memory card, and the like. In other embodiments, the processor 1618 may access information from, and store data in, memory that is not physically located on the WTRU 1602, such as on a server or a home computer (not shown).

The processor 1618 may receive power from the power source 1634, and may be configured to distribute and/or control the power to the other components in the WTRU 1602. The power source 1634 may be any suitable device for powering the WTRU 1602. As examples, the power source 1634 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

The processor 1618 may also be coupled to the GPS chipset 1636, which may be configured to provide location information (e.g., longitude and latitude) regarding the current location of the WTRU 1602. In addition to, or in lieu of, the information from the GPS chipset 1636, the WTRU 1602 may receive location information over the air interface 1615 from a base station and/or determine its location based on the timing of the signals being received from two or more nearby base stations. It will be appreciated that the WTRU 1602 may acquire location information by way of any suitable location-determination method while remaining consistent with an embodiment.

The processor 1618 may further be coupled to other peripherals 1638, which may include one or more software and/or hardware modules that provide additional features, functionality and/or wired or wireless connectivity. For example, the peripherals 1638 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 17:
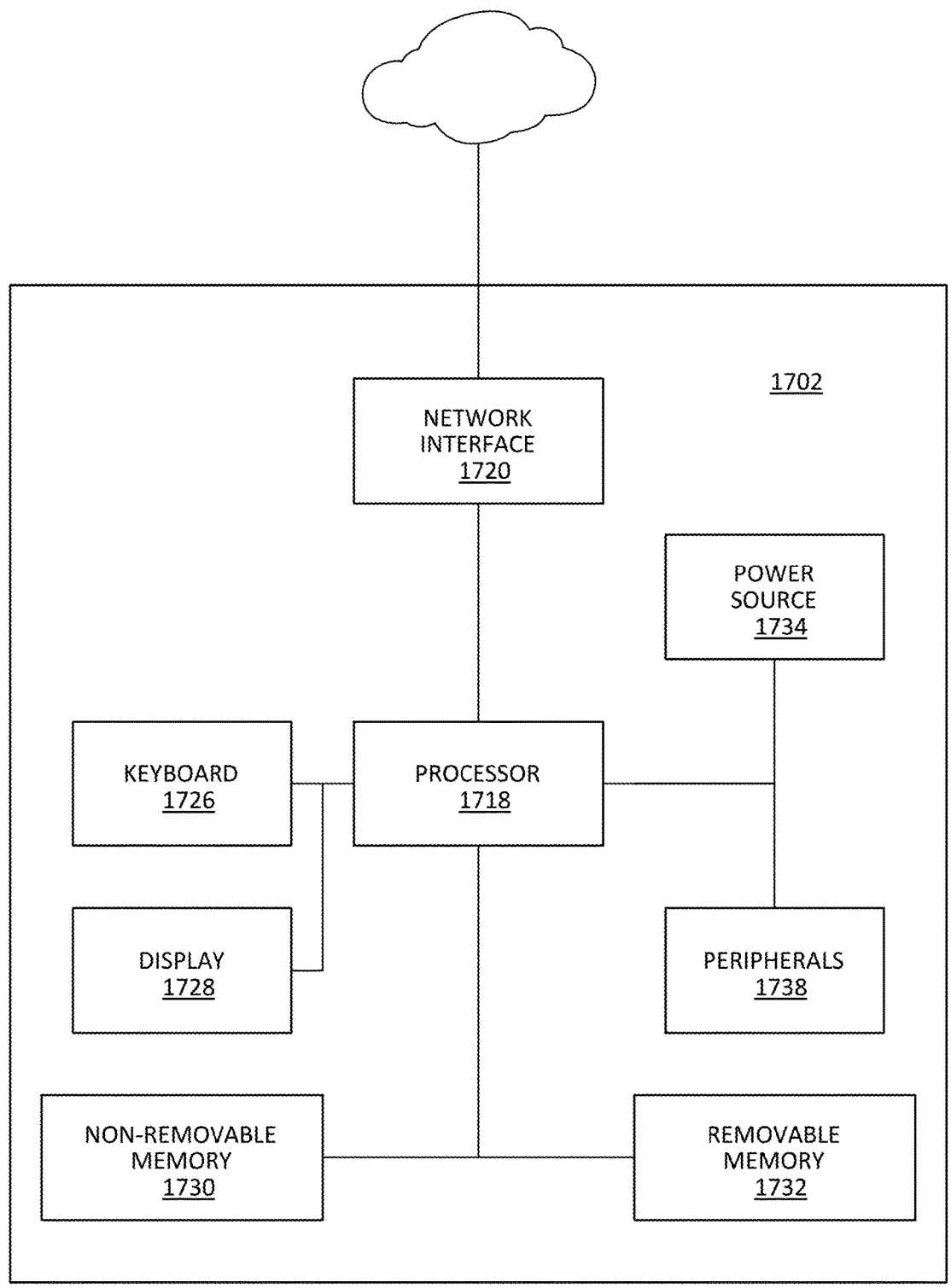
FIG. 17 is a block diagram of one example of a server that may be employed in a multi-device digital experience configuration.

In some examples, the disclosed systems and methods may include a networked server, such as server 1702 illustrated in FIG. 17. To this end, the systems and methods may be implemented as hardware and software modules on a networked server.

As shown in FIG. 17, the server 1702 may include a processor 1718, a network interface 1720, a keyboard 1726, a display 1728, a non-removable memory 1730, a removable memory 1732, a power source 1734, and other peripherals 1738. The server 1702 may include any sub-combination of the foregoing elements while remaining consistent the desired functionality of the reputation service. The server may be in communication with the internet and/or with proprietary networks.

The processor 1718 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 1718 may perform signal coding, data processing, power control, input/output processing, and/or any other functionality that enables the server 1702 to operate in a wired or wireless environment. The processor 1718 may be coupled to the network interface 1720. While FIG. 17 depicts the processor 1718 and the network interface 1720 as separate components, the processor 1718 and the network interface 1720 may be integrated together in an electronic package or chip.

The processor 1718 of the server 1702 may be coupled to, and may receive user input data from, the keyboard 1726, and/or the display 1728 (e.g., a liquid crystal display (LCD) display unit or organic light-emitting diode (OLED) display unit). The processor 1718 may also output user data to the display/touchpad 1728. In addition, the processor 1718 may access information from, and store data in, any type of suitable memory, such as the non-removable memory 1730 and/or the removable memory 1732. The non-removable memory 1730 may include random-access memory (RAM), read-only memory (ROM), a hard disk, or any other type of memory storage device. In other examples, the processor 1718 may access information from, and store data in, memory that is not physically located at the server 1702, such as on a separate server (not shown).

The processor 1718 may receive power from the power source 1734, and may be configured to distribute and/or control the power to the other components in the server 1702. The power source 1734 may be any suitable device for powering the server 1702, such as a power supply connectable to a power outlet.

Although features and elements are described above in particular combinations, each feature or element can be used alone or in any combination with the other features and elements. In addition, the systems and methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method, performed by an augmented reality (AR) wearable display device, for configuring a multi-display device digital AR experience, the method comprising:
   initially presenting a first content portion of a digital AR experience via a display of the AR wearable display device in an environment that includes a set of one or more additional display devices, wherein the digital AR experience is initially presented in the environment only on the display of the AR wearable display device;
   identifying a first display device of the set of one or more additional display devices based on one or more communication protocols;
   after the initial presentation of the first content portion of the digital AR experience and during a continued presentation of the first content portion of the digital AR experience, extending the digital AR experience from only the AR wearable display device to also the first display device such that a second content portion of the digital AR experience is being presented by the first display device in the environment;
   while the second content portion is being presented, capturing, test-signal-output data presented by the first display device, the test-signal-output data being based on a test signal sent to at least the first display device of the set of one or more additional display devices, wherein the test-signal-output data is a subset of the second content portion being presented by the first display device;
   estimating spatial-characteristic data of the first display device based on the captured test-signal-output data; and
   modifying the second content portion of the digital AR experience based on the estimated spatial-characteristic data of the first display device.

2. The method of claim 1, further comprising sending, to the first display device, a second-content-portion stream that comprises the second content portion of the digital AR experience.

3. The method of claim 1, further comprising sending the test signal to the first display device, wherein the test signal comprises a fiducial marker detectable by the AR wearable display device.

4. The method of claim 1, further comprising analyzing second-content-portion data presented by the first display device, wherein modifying the second content portion of the digital AR experience is further based on the analyzed second-content-portion data.

5. The method of claim 1, wherein extending the digital AR experience from only the AR wearable display device to also the first display device such that the second content portion of the digital AR experience is being presented via the first display device comprises:
   sending, to the first display device, a second-content-portion stream that comprises the second content portion of the digital AR experience; and
   extending the digital AR experience from only the AR wearable display device to also the first display device and also a second display device in the set of one or more additional display devices in the environment, such that a third content portion of the digital AR experience is being presented via the second display device while the second content portion of the digital AR experience is being presented via the first display device.

6. The method of claim 5, further comprising:
   tracking a change in relative location of the AR wearable display device with respect to the first display device in the environment and with respect to the second display device in the environment as a user wearing the AR wearable display device moves in the environment from a first location to a second location; and
   modifying the second content portion and the third content portion of the digital AR experience based on the tracked change in relative location of the AR wearable display device and based on the user and AR wearable display device moving in the environment from the first location to the second location.

7. The method of claim 1, wherein the AR wearable display device comprises an RGB-D sensor, and wherein capturing the test-signal-output data further comprises capturing the test-signal-output data using the RGB-D sensor.

8. The method of claim 1, further comprising:
   terminating a connection with the first display device; and
   marking the first display device as at least one of an unused display device or an underperforming display device.

9. The method of claim 1, wherein identifying the first display device using one or more communication protocols comprises:
   polling for output devices in the environment;
   detecting the first display device as one or more available output devices in the environment; and
   establishing a connection with the first display device.

10. The method of claim 1, further comprising iteratively adjusting the estimated spatial-characteristic data of the first device based on a comparison of the presented second content portion of the digital AR experience to an expected presentation of the second content portion of the digital AR experience.

11. The method of claim 1, further comprising:
   evaluating the presented second content portion of the digital AR experience based on an expected presentation of the second content portion of the digital AR experience; and
   determining, based on the evaluating, whether the first display device is underperforming in presenting the second content portion of the digital AR experience.

12. The method of claim 1, further comprising ceasing presentation of the second content portion of the digital AR experience responsive to determining that the first display device is underperforming in presenting the second content portion of the digital AR experience.

13. The method of claim 1, wherein the estimated spatial-characteristic data of the first display device comprises at least one of location data of the first device or orientation data of the first display device.

14. The method of claim 1, wherein:
   estimating spatial-characteristic data of the first display device based on the captured test-signal-output data further comprises:
      determining a physical distance between the AR wearable display device and the first display device;
   and, wherein:
   modifying the second content portion of the digital AR experience based on the estimated spatial-characteristic data of the first display device further comprises:
      data of the first display device further comprises:
      in accordance with the determined physical distance, adding a black mask as the second content portion at the first display device to minimize an anticipated visual effect from the perspective of a user wearing the AR wearable display device at the determined physical distance.

15. The method of claim 1, further comprising:
terminating a connection with the first display device; and
after terminating the connection, returning to presenting the digital AR experience in the environment only on the display of the AR wearable display device.

16. The method of claim 1, further comprising:
using a dedicated content server to distribute content of the digital AR experience to the first display device.

17. A system for configuring a multi-device digital AR experience, the system comprising:
an AR wearable display device configured to:
initially present, via a display of the wearable display device, a first content portion of a digital AR experience in an environment that includes a set of one or more additional display devices, wherein the digital AR experience is initially presented in the environment only on the display of the AR wearable display device;
identify a first display device of the set of one or more additional display devices based on one or more communication protocols;
after the initial presentation of the first content portion of the digital AR experience and during a continued presentation of the first content portion of the digital AR experience, extending the digital AR experience from only the AR wearable display device to also the first display device such that the first display device is configured to present a second content portion of the digital AR experience in the environment;
while the second content portion is being presented, capture, test-signal-output data presented by the first display device, the test-signal-output data being based on a test signal sent to at least the first display device of the set of one or more additional display devices, wherein the test-signal-output data is a subset of the second content portion being presented by the first display device;
estimate spatial-characteristic data of the first display device based on the captured test-signal-output data; and
modify the second content portion of the digital AR experience based on the estimated spatial-characteristic data of the first display device.

18. The system of claim 17, wherein the AR wearable display device is further configured to:
send, to the first display device, a second-content-portion stream that comprises the second content portion of the digital AR experience.

19. The system of claim 17, wherein the AR wearable display device is further configured to:
send the test signal to the first display device, wherein the test signal comprises a fiducial marker detectable by the AR wearable display device.

20. The system of claim 17, wherein the AR wearable display device is further configured to:
iteratively adjust the estimated spatial-characteristic data of the first device based on a comparison of the presented second content portion of the digital AR experience to an expected presentation of the second content portion of the digital AR experience.

* * * * *